(12) United States Patent
Togino

(10) Patent No.: US 6,633,337 B1
(45) Date of Patent: Oct. 14, 2003

(54) ELECTRONIC CAMERA

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/016,805

(22) Filed: Jan. 30, 1998

(30) Foreign Application Priority Data

Jan. 31, 1997 (JP) .............................. 9-018886

(51) Int. Cl.[7] .............................................. H04N 5/222
(52) U.S. Cl. ................... 348/333.08; 348/341; 359/637
(58) Field of Search ........................ 348/333.09, 333.11, 348/341, 333.08; 359/631, 633, 637

(56) References Cited

U.S. PATENT DOCUMENTS

| 4,496,981 | A | * | 1/1985 | Ota .............................. 348/294 |
| 5,161,025 | A | * | 11/1992 | Nakao .................... 348/333.09 |
| 5,442,453 | A | | 8/1995 | Takagi et al. |
| 5,517,278 | A | * | 5/1996 | Takahara et al. ............ 396/374 |
| 5,550,585 | A | * | 8/1996 | Cherri .................... 348/207.99 |
| 5,768,025 | A | * | 6/1998 | Togino et al. .............. 359/633 |

FOREIGN PATENT DOCUMENTS

| EP | 687 932 | 12/1995 |
| EP | 722 106 | 7/1996 |
| EP | 730 183 | 9/1996 |
| JP | 8-046834 | 2/1996 |
| JP | 8-051561 | 2/1996 |
| JP | 8-201912 | 8/1996 |

* cited by examiner

Primary Examiner—Wendy R. Garber
Assistant Examiner—Matthew L Rosendale
(74) Attorney, Agent, or Firm—Pillsbury Winthrop LLP

(57) ABSTRACT

The invention relates to a compact electronic camera which enables an electronic image to be displayed on a two-dimensional display element while it is phototaken or after it has been phototaken, so that the image can be magnified and displayed by a compact magnifying optical system constructed of a curved reflecting mirror to view a phototaken image of high precision. An electronic camera for photoelectrically converting a subject image formed by a phototaking optical system 2 into an electronic image to be recorded comprises a two-dimensional display element 4 for displaying an electronic image during or after phototaking and a magnifying optical system 5 for magnifying an image displayed on the two-dimensional display element 4 in the form of a virtual image. The magnifying optical system 5 is constructed of at least one curved reflecting mirror 26 and a surface 28 having a combined reflecting and transmitting action.

9 Claims, 13 Drawing Sheets

4 Two-dimensional display element
9 Two-dimensional image pickup element

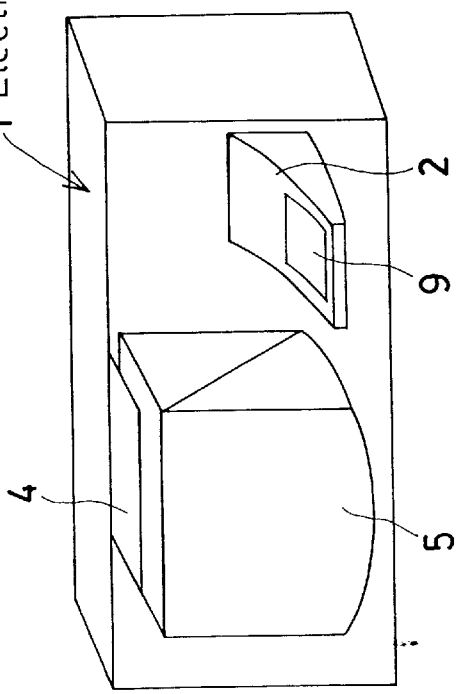
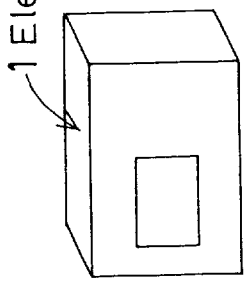
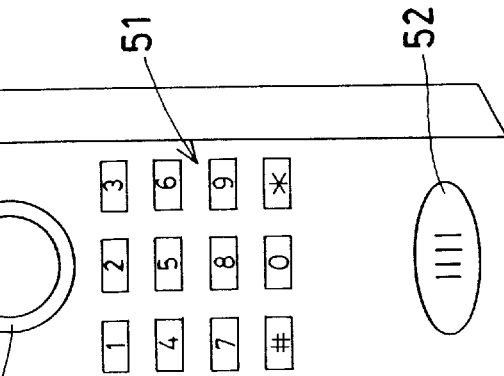
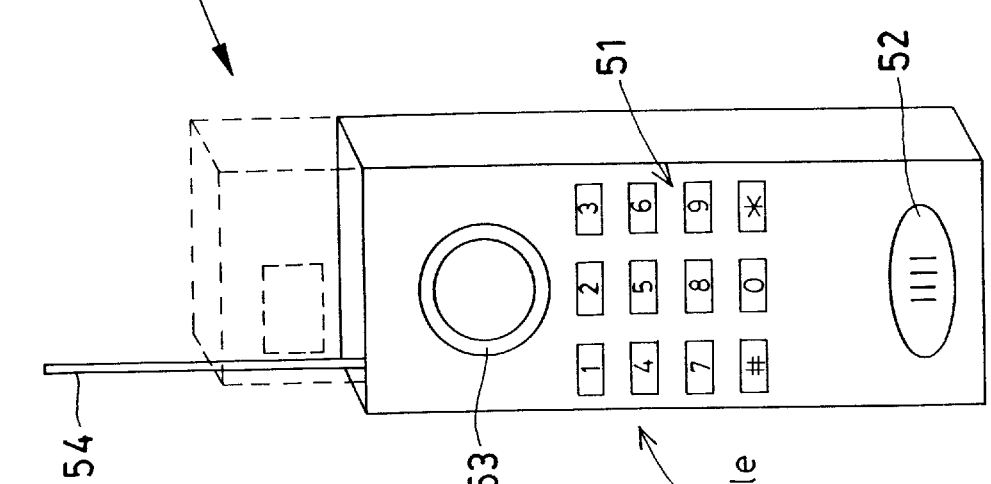

ELECTRONIC CAMERA

BACKGROUND OF THE INVENTION

The present invention relates generally to an electronic camera designed to phototake a subject using a two- dimensional image pickup device, and more particularly to an electronic still camera comprising a display means for displaying an electronic image while it is phototaken or after it has been phototaken.

So far, an optical finder and an electronic view finder have been known for an electronic still camera finder.

A typical optical finder is disclosed in EP0722106A2. An optical system designed to view an external image while a liquid crystal display field frame is superposed on the external image is disclosed in JP-A 8-201912.

With both finders, however, it is impossible to view a phototaken electronic image through them because they are of the type that an external object is viewed through them apart from the electronic image phototaken by an phototaking optical system.

Some electronic view finders comprising a liquid crystal display element of small size to be attached to a back side of a camera body are disclosed in JP-A's 8-46834 and 8-51561. A loupe optical system designed to magnify and display an electronic image displayed a display element is also available.

One problem with the aforesaid electronic view finder of the direct view type that a two-dimensional display element is attached to the back side of the camera body is that the two-dimensional display element used must be of small size because it is impossible to increase the size of the camera body. Another problem is that when a high-precision image is displayed, it is difficult to take a full view of the image with the naked eye because the display screen used is too small. With the loupe optical system, on the other hand, it is difficult to achieve a compact electronic camera because the axial size of the loupe, that is, the size of the loupe in the depth direction of the camera becomes large.

SUMMARY OF THE INVENTION

In view of such problems associated with the prior art, an object of the present invention is to provide a compact electronic camera designed to display an electronic image on a two-dimensional display element while it is phototaken or after it has been phototaken and magnify the thus displayed image in the form of a virtual image using a compact magnifying optical system comprising a curved reflecting mirror, so that the phototaken image can be viewed with high precision.

According to the present invention, the aforesaid object is achieved by the provision of an electronic camera comprising a phototaking optical system, a two-dimensional image pickup element for receiving an object image formed by said phototaking optical system, a two-dimensional display element for displaying said object image in the form of an image to be viewed, and a magnifying optical system for guiding said image to a viewer's eyeball, wherein said magnifying optical system includes a first reflecting surface for turning back an optical path between said two-dimensional display element and said viewer's eyeball to achieve compactness, said first reflecting surface being defined by a curved surface having an action to magnify said image.

Preferably in this case, the magnifying optical system further includes a second reflecting surface located in opposition to the first reflecting surface to turn back an optical path between the first and second reflecting surfaces, thereby making a distance between the two-dimensional display element and the viewer's eyeball short.

The first and second reflecting surfaces may be provided by a prism member made up of a transparent medium having a refractive index (n) greater than 1.3 (n>1.3).

In this case, the first reflecting surface may be formed on one surface of the prism member while the second reflecting surface is located at a position of the prism member such that the medium is sandwiched between the first and second reflecting surfaces.

Further, the second reflecting surface may behave as a combined transmitting and reflecting surface.

It is desired that at least one of the first and second reflecting surfaces be defined by a rotationally asymmetric surface having an action to make correction for aberrations produced by decentration.

Furthermore in that case, the two-dimensional image pickup element may be located in opposition to the two-dimensional display element.

The magnifying optical system may have two actions, one to guide an image displayed on the two-dimensional display element to the viewer's eyeball and the other to guide object light phototaken by the phototaking optical system directly to the viewer's eyeball.

The electronic camera of the invention may further comprise between the two-dimensional image pickup element and the two-dimensional display element a signal processing circuit, a controller, a driver and a recording/reproducing unit so that the object image received at the two-dimensional image pickup element is recorded in the recording/reproducing unit upon photoelectric conversion and, at the same time, is displayed on the two-dimensional display element by the driver via the controller during phototaking, and, upon phototaking, a signal recorded in the recording/reproducing unit is reproduced to display an electronic image on the two-dimensional display element by the driver via the controller.

Reference is made to why the aforesaid arrangements are adopted in the invention, and how they work. In the invention, the magnifying optical system for projecting a virtual image form of electronic image on a magnified scale is constructed of at least one curved reflecting mirror and a surface having a combined transmitting and reflecting action, so that an eyepiece optical system having a large exit pupil diameter can be achieved. This, in turn, makes it possible to display an electronic image on the two-dimensional display element during or after phototaking so that it can be easily viewed in a virtual image form through the magnifying optical system.

If, in the invention, the magnifying optical system is be constructed of a prism body comprising a transparent medium having a refractive index of at least 1, the magnifying optical system can then be easily assembled because the reflecting surface can be integrated with the surface having a combined transmitting and reflecting action.

If, in the invention, the curved reflecting surface of the magnifying optical system is constructed of a back-surface mirror, it is then possible to reduce the curvature of the curved reflecting mirror (or increase the radius of curvature thereof), thereby reducing aberrations produced at the reflecting surface. This, in turn, makes it possible to reduce an aberration change upon movement of the viewer's eyeball and, hence, provide an easy-to-view electronic image of high precision.

Here let f (mm) denote the focal length of the magnifying optical system. It is then desired to satisfy $$f<30 \tag{1}$$

In other words, the overall size of the electronic camera according to the invention can be reduced by shortening the magnifying optical system. A problem with a conventional finder optical system using a transmitting lens system is that the focal length of an eyepiece optical system cannot be made short because some considerable aberrations occur due to the fact that a main power for the optical system is obtained by a transmitting surface.

It is more preferable to satisfy $$f<20 \tag{2}$$

This is because the optical system of smaller size can be achieved.

Here let L (mm) represent the diagonal length of the two-dimensional display element. It is then desired to satisfy $$L<25 \tag{3}$$

In other words, the size of the electronic camera according to the invention can be reduced by reducing the magnitude of the opposite angle of the two-dimensional display element in the finder optical system. It is thus important to satisfy condition (3). If L>25, the size of a two-dimensional display element built in an electronic camera then becomes too large to reduce the size of the electronic camera.

It is more preferable to satisfy $$L<18 \tag{4}$$

It is most preferable to satisfy $$L<15 \tag{5}$$

If, in the invention, the electronic view finder is used in combination with an optical finder, it is then possible to achieve an electronic camera of smaller size that is the object of the invention. In this case, it is possible to display a previously phototaken image and an object image being phototaken in a superposed fashion. It is also possible to synthesize an object image and a previously phototaken electronic image or phototake an image through the finder while position information is displayed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 is a sectional schematic of an eyepiece optical system according to Example 11 during see-through.

FIG. 24 is a perspective view of a hand-portable telephone system according to Example 16.

DESCRIPTION OF THE PREFERRED EMBODIMENTS

Given below are examples of the electronic camera according to the invention.

Figure 1:
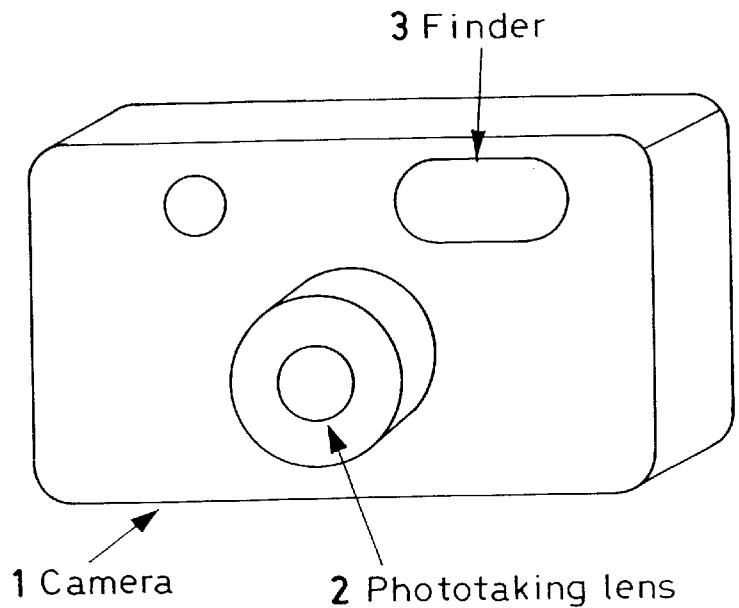
FIG. 1 is a conceptual diagram showing one embodiment of the electronic camera according to the invention.

FIG. 1 is a conceptual diagram showing an external appearance of the electronic camera according to the invention. An electronic camera shown generally by 1 comprises a phototaking lens (objective) 2. As will be described later, an image formed by the phototaking lens 2 is converted to an image signal by a CCD or other two-dimensional image pickup element (not shown) located in a camera body, and then recorded in a recording/reproducing unit. When the electronic camera 1 uses an optical finder, it further includes a finder 3.

Figure 2:
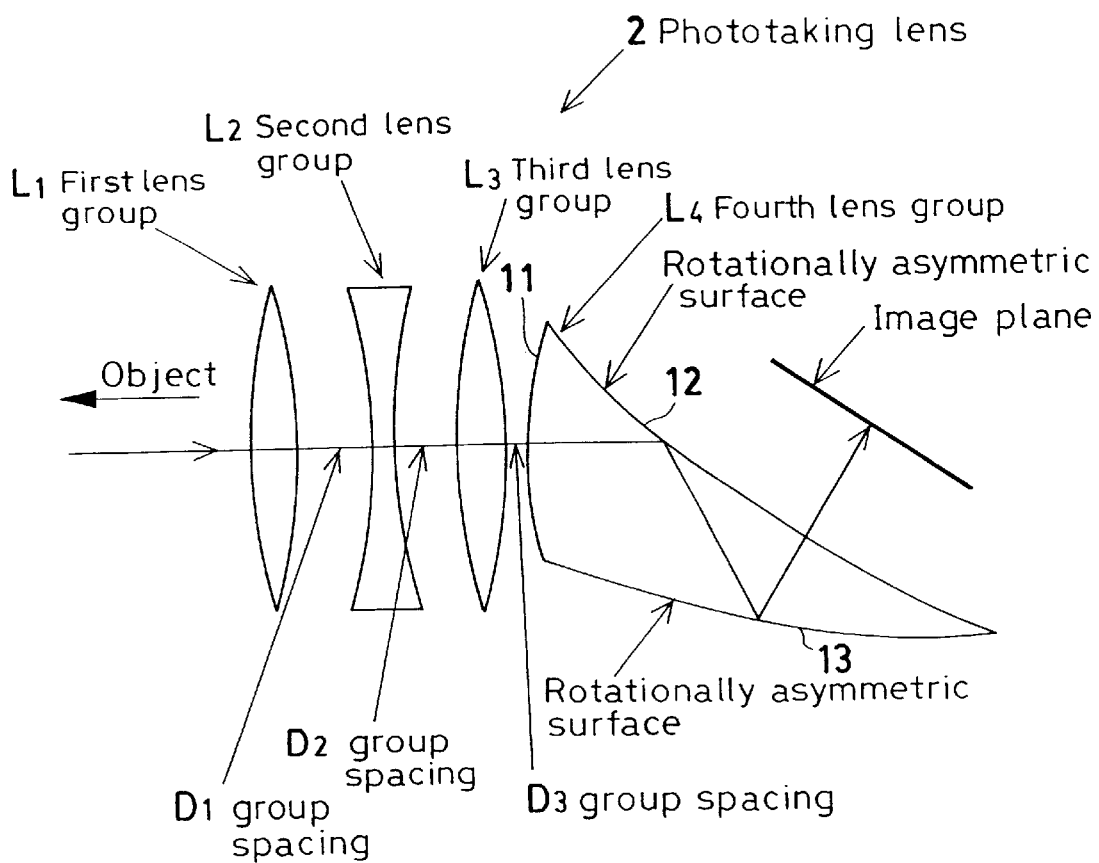
FIG. 2 is a sectional schematic showing one embodiment of the phototaking lens system used in the electronic camera of the invention.

FIG. 2 is a sectional schematic showing one embodiment of the phototaking lens 2 of some depth, which can be used on such an electronic camera 1. In this case, this phototaking lens is designed in the form of a zoom lens. The phototaking lens system 2 comprises a first lens group $L_1$, a second lens group $L_2$, a third lens group $L_3$ and a fourth lens group $L_4$. The fourth lens group $L_4$ comprises a transparent medium having a refractive index greater than 1, which is surrounded with a first or transmitting surface 11, a second or rotationally asymmetric surface 12 that is decentered and has a combined transmitting and reflecting action and a third surface or rotationally asymmetric back-surface mirror 13 that is decentered and has a reflecting action, and is in such a shape that light incident on the first surface 11 is reflected at the second surface 12, then reflected at the third surface 13, and finally transmits through the second surface 12. For zooming, at least two spacings of a spacing $D_1$ between the first lens group $L_1$ and the second lens group $L_2$, a spacing $D_2$ between the second lens group $L_2$ and the third lens group $L_3$ and a spacing $D_3$ between the third lens group $L_3$ and the fourth lens group $L_4$ are made variable. Note that the rotationally asymmetric surface will be explained later.

EXAMPLE 1

Figure 3:
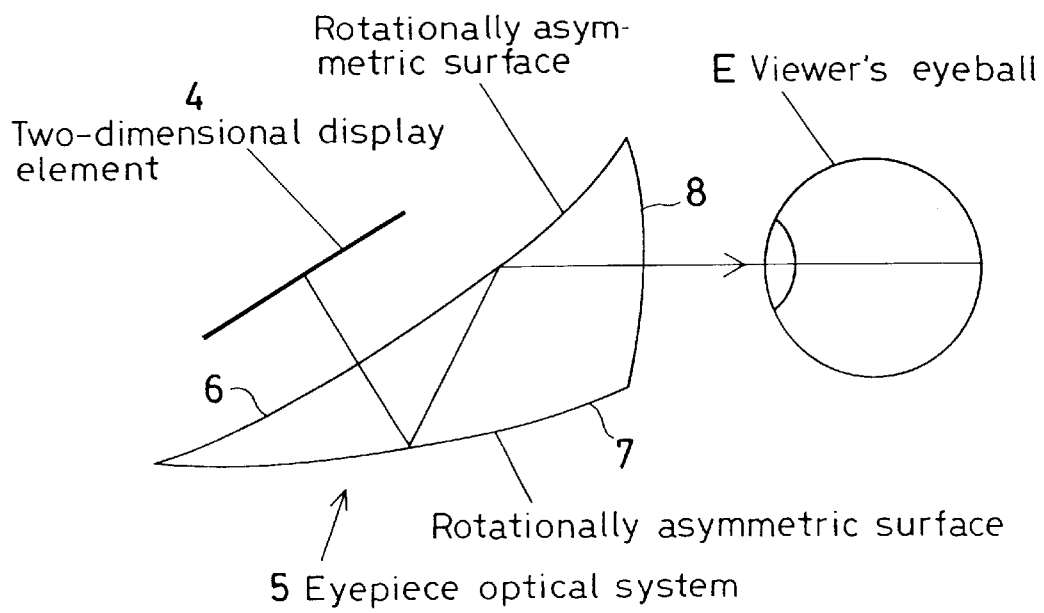
FIG. 3 is an optical path diagram for an electronic view finder optical system according to Example 1.

FIG. 3 is an optical path diagram for an electronic view finder optical system in the first example of such an electronic camera 1 as depicted in FIG. 1. This finder optical system comprises a two-dimensional display element 4 such as a liquid crystal display (LCD) and an eyepiece optical system 5. The eyepiece optical system 5 has a given finite focal length, and is made up of a transparent medium having a refractive index greater than 1, which is surrounded with a first or rotationally asymmetric surface 6 that is decentered in opposition to the two-dimensional display element 4 and has a combined transmitting and reflecting action, a second surface or rotationally asymmetric back-surface mirror 7 that is decentered and has a reflecting action and a third or transmitting surface 8. In this optical system, display light leaving an electronic image on the two-dimensional display element 4 is reflected at the second surface 7 through the first surface 6, then reflected at the first surface 6, and finally transmits through the third surface 8 to arrive at a viewer's eyeball E.

It is here to be noted that the aforesaid rotationally asymmetric surface may be formed by either a free form surface symmetric with respect to plane, which has only one plane of symmetry or an asymmetric polynomial surface (APS) having no plane of symmetry. The latter case is characterized in that the surface is decentered three-dimensionally rather than in one section alone.

It is here to be noted that the free form surface symmetric with respect to plane, and APS is defined by the following polynomial:

$$Z = {}_2 + C_3 y + C_4 x + C_5 y^2 + C_6 yx + C_7 x$$
$$2 + C_8 y^3 + C_9 y^2 x + C_{10} yx^2 + C_{11} x$$
$$3 + C_{12} y^4 + C_{13} y^3 x + C_{14} y^2 x^2 + C$$
$$15 yx^3 + C_{16} x$$
$$4 + C_{17} y^5 + C_{18} y^4 x + C_{19} y^3 x^2 + C$$
$$20 y^2 x^3 + C_{21} yx^4 + C$$
$$22 x_5 + C_{23} y^6 + C_{24} y^5 x + C_{25} y^4 x^2 + C_{26} y$$
$$3 x^3 + C_{27} y^2 x^4 + C_{28} yx^5 + C_{29} x$$
$$6 + C_{30} y^7 + C_{31} y^6 x + C_{32} y^5 x^2 + C$$
$$33 y^4 x^3 + C_{34} y^3 x^4 + C_{35} y^2 x$$
$$5 + C_{36} yx^6 + C_{37} x^7 \quad \text{(a)}$$

where Cm (m is an integer of 2 or greater) is a coefficient.

In general, the curved surface defined by polynomial (a) has no plane of symmetry in either the X-Z plane or the Y-Z plane (APS). If all odd terms for x are reduced to zero, however, it is then possible to obtain a free from surface having only one plane of symmetry parallel with the Y-Z plane. For instance, this may be achieved by reducing coefficients for terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . in polynomial (a) to zero.

Also, if all odd terms for y are reduced to zero, it is then possible to obtain a free form surface symmetric with respect to plane, which has only one plane of symmetry parallel with the X-Z plane. For instance, this may be achieved by reducing $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . in polynomial (a) to zero. Such plane of symmetry leads to productivity improvements.

By use of either the plane of symmetry parallel with the Y-Z plane or the plane of symmetry parallel with the X-Z plane, it is possible to make effective correction for rotationally asymmetric aberrations produced due to decentration.

Figure 4:
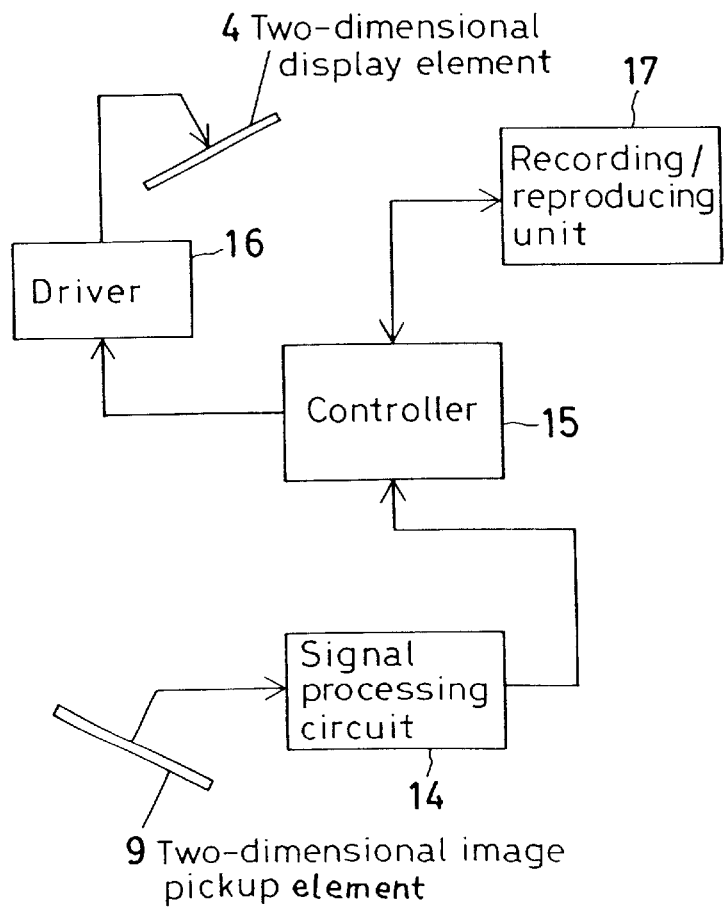
FIG. 4 is a block diagram of how an electronic image is displayed.

To display an electronic image on such an electronic view finder while phototaking is conducted or after phototaking has finished, an image of a subject is photoelectrically converted by a two-dimensional image pickup element 9 located at an image plane of such a phototaking lens 2 as depicted in FIG. 2, as schematically shown in FIG. 4. The resulting subject signal is recorded in a recording/reproducing unit 17 via a signal processing circuit 14 and a controller 15. During phototaking, the signal is displayed in the form of an electronic image on the two-dimensional display element 4 by a driver 16 via the controller 15. After phototaking, the signal recorded in the recording/reproducing unit 17 is reproduced to display the electronic image on the two-dimensional display element 4 by the driver 16 via the controller 15.

EXAMPLE 2

Figure 5:
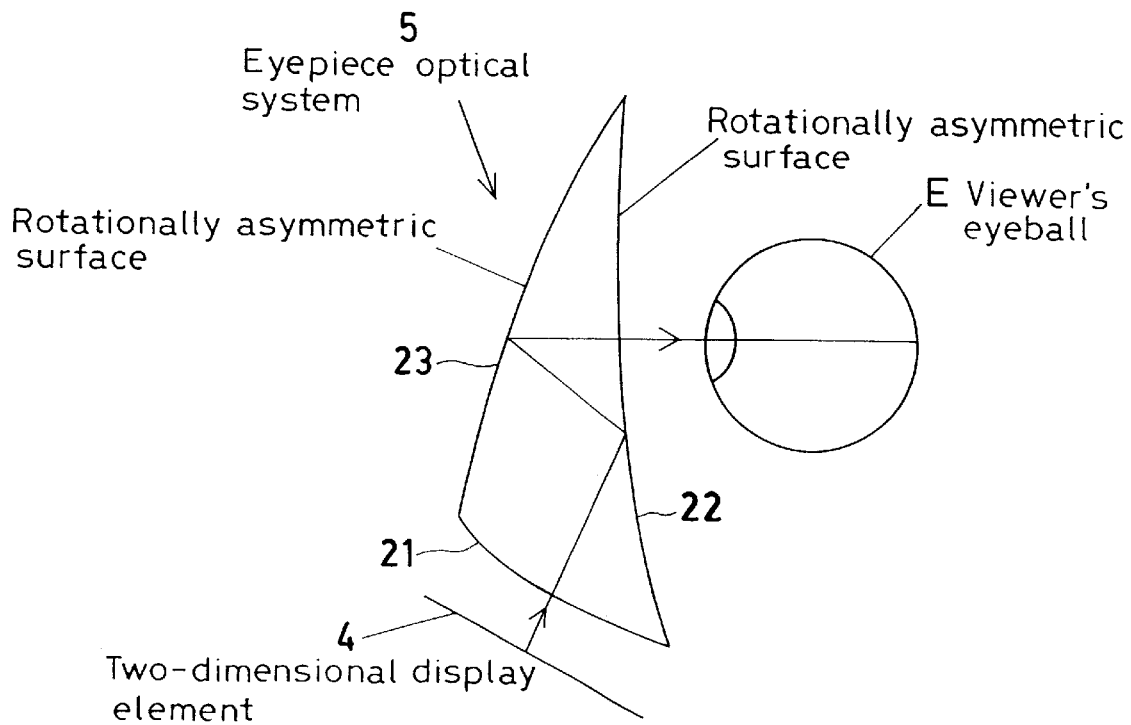
FIG. 5 is an optical path diagram for an electronic view finder optical system according to Example 2.

FIG. 5 is an optical path diagram for an electronic view finder optical system according to Example 2. This optical finder system comprises a two-dimensional display element 4 and an eyepiece optical system 5. The eyepiece optical system 5 is similar to the fourth lens group $L_4$ shown in FIG. 2, and is made up of a transparent medium having a refractive index greater than 1, which is surrounded with a first or transmitting surface 21 that is located in opposition to the two-dimensional display element 4, a second or rotationally asymmetric surface 22 that is decentered and has a combined transmitting and reflecting action, and a third surface or rotationally asymmetric back-surface mirror 23 that is decentered and has a reflecting action. This eyepiece optical system has a given finite focal length. In this optical system, display light leaving an electronic image on the two-dimensional display element 4 is reflected at the second surface 22 through the first surface 21, then reflected at the third surface 23, and finally transmits through the second surface 22 to arrive at a viewer's eyeball E.

EXAMPLE 3

Figure 6:
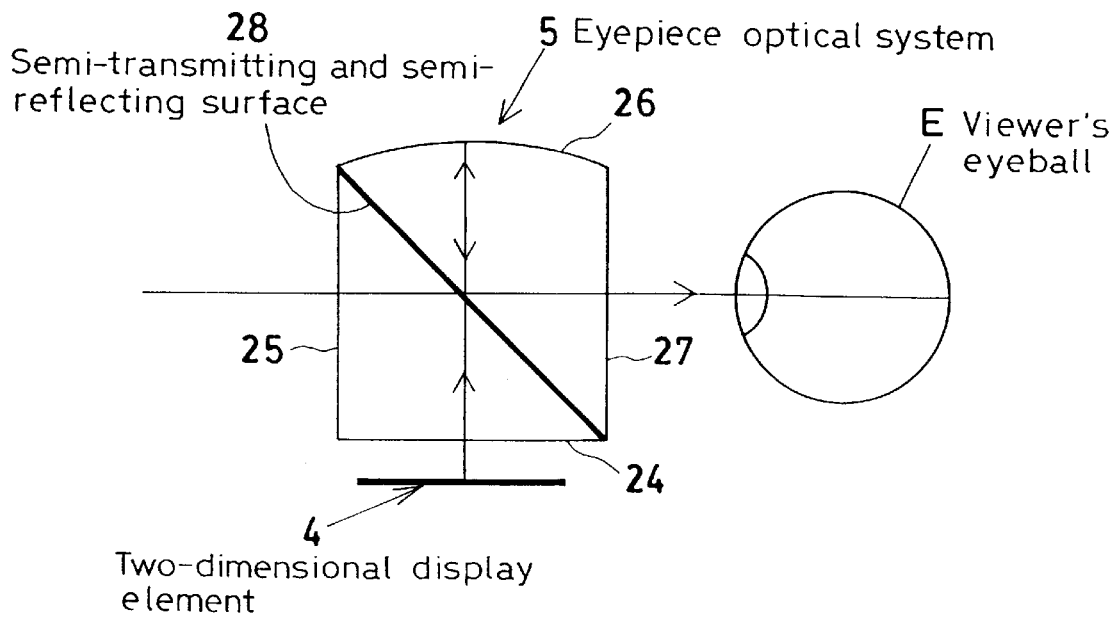
FIG. 6 is an optical path diagram for an electronic view finder optical system according to Example 3.

FIG. 6 is an optical path diagram for an electronic view finder optical system according to Example 3. This view finder optical system comprises a two-dimensional display element 4 and an eyepiece optical system 5. The eyepiece optical system 5 has a beam splitter prism form and is made up of a transparent medium having a refractive index greater than 1, which is surrounded with a first surface 24, a second surface 25, a third surface 26 and a fourth surface 27 and includes therein an obliquely extending semi-transmitting and semi-reflecting surface 28 in the form of a surface having a combined transmitting and reflecting action. For instance, the semi-transmitting and semi-reflecting surface 28 may be constructed of a surface having a reflectance of 10 to 90% and a transmittance of 90 to 10%. The third surface 26 that does not oppose to the two-dimensional display element 4 is constructed of a back-surface concave mirror.

In such an arrangement, display light leaving an electronic image on the two-dimensional display element 4 transmits through the first surface 24 and the semi-transmitting and semi-reflecting surface 28, whereupon the light is reflected at the back-surface mirror or reflecting surface 26 and then at the semi-transmitting and semi-reflecting surface 28. Finally, the light transmits through the fourth surface 27 to arrive at a viewer's eyeball E.

Thus, the eyepiece optical system 5 can be made substantially free of aberrations by constructing it of a prism body and a surface having a major power of the back-surface mirror 26.

By applying a rotationally asymmetric surface to the entrance surface 24 of the eyepiece optical system 5 nearest to the two-dimensional display element 4, it is possible to make effective correction for image distortion. By tilting the semi-transmitting and semi-reflecting surface 28 having a combined transmitting and reflecting action with respect to the optical axis, it is also possible to prevent the two-dimensional display element 4 from projecting toward an viewer side of the electronic camera.

EXAMPLE 4

Figure 7:
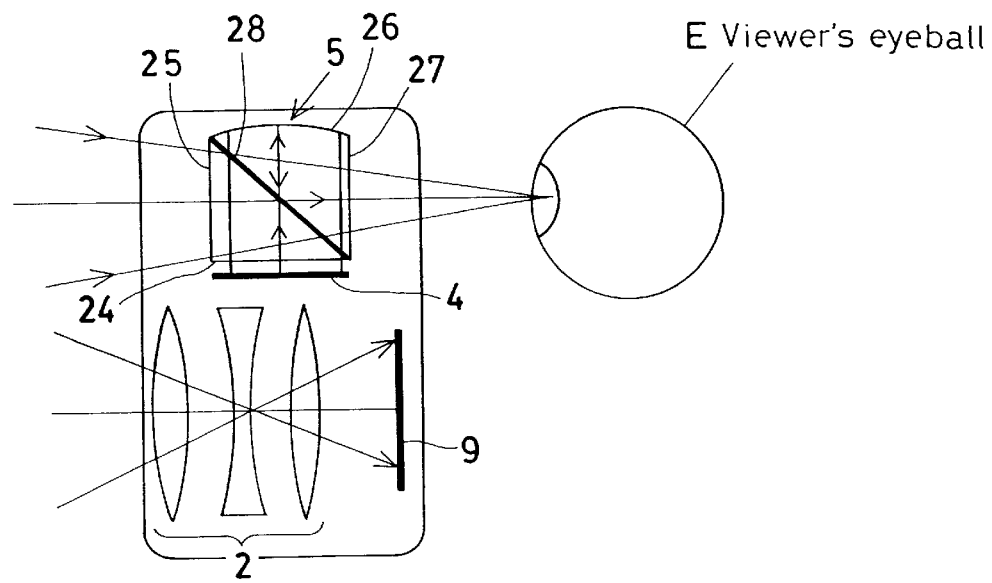
FIG. 7 is an optical path diagram for an electronic camera optical system according to Example 4.

FIG. 7 is an optical path diagram for an electronic cameral optical system according to Example 4. In this example, an electronic camera is designed using the finder optical system according to Example 3. A rotationally symmetric optical system is used for a phototaking lens 2.

An eyepiece optical system 5 is made up of a transparent medium having a refractive index greater than 1, which is 20 surrounded with a first surface 24, a second surface 25, a third surface 26 and a fourth surface 27, and includes therein an obliquely extending semi-transmitting and semi-reflecting surface 28 having a combined reflecting and transmitting action. The third surface 26 that does not oppose to the two-dimensional display element 4 is constructed of a back-surface concave mirror.

In this example, a see-through optical path runs through the second surface 25, semi-transmitting and semi-reflecting surface 28 and fourth surface 27, but does not arrive at the concave mirror 26, so that an external image can be viewed apart from an image (electronic image) displayed on the two-dimensional display element 4. For phototaking, on the one hand, it is thus possible to use the aforesaid see-through optical path in the eyepiece optical system 5 as an optical finder. For viewing a previously phototaken image, on the other hand, it is possible to display an electronic image recorded in the two-dimensional display element 4, so that the image can be displayed on a magnified scale using the eyepiece optical system 5. This eliminates the need of constantly driving the two-dimensional display element 4, resulting in power savings and, hence, an increase in the life of the power source used.

Furthermore, various setting factors for an electronic camera, e.g., residual battery capacity, residual memory capacity, the possible number of phototaking, object distance information, azimuth information, and GSP position information can be displayed on the two-dimensional display element 4, so that a subject can be visually identified through the see-through optical path while they are magnified by the eyepiece optical system 5.

It is noted that when it is unnecessary to view the subject through the aforesaid see-through optical path or when a previously phototaken image is identified, it is possible to shield or attenuate the see-through optical path by means of a liquid crystal shutter, a mechanical shutter or the like, so that an image through an electronic image-magnifying optical path can be better identified.

Especially when images of human figures, etc. are phototaken while they are continuously displayed on the two-dimensional display element 4, it is possible to preserve an well-taken image alone or discard useless images.

In addition, if a transmitting lens system is added to the aforesaid see-through optical path, it is then possible to vary the see-through magnification (the magnification of the optical finder).

EXAMPLE 5

Figure 8:
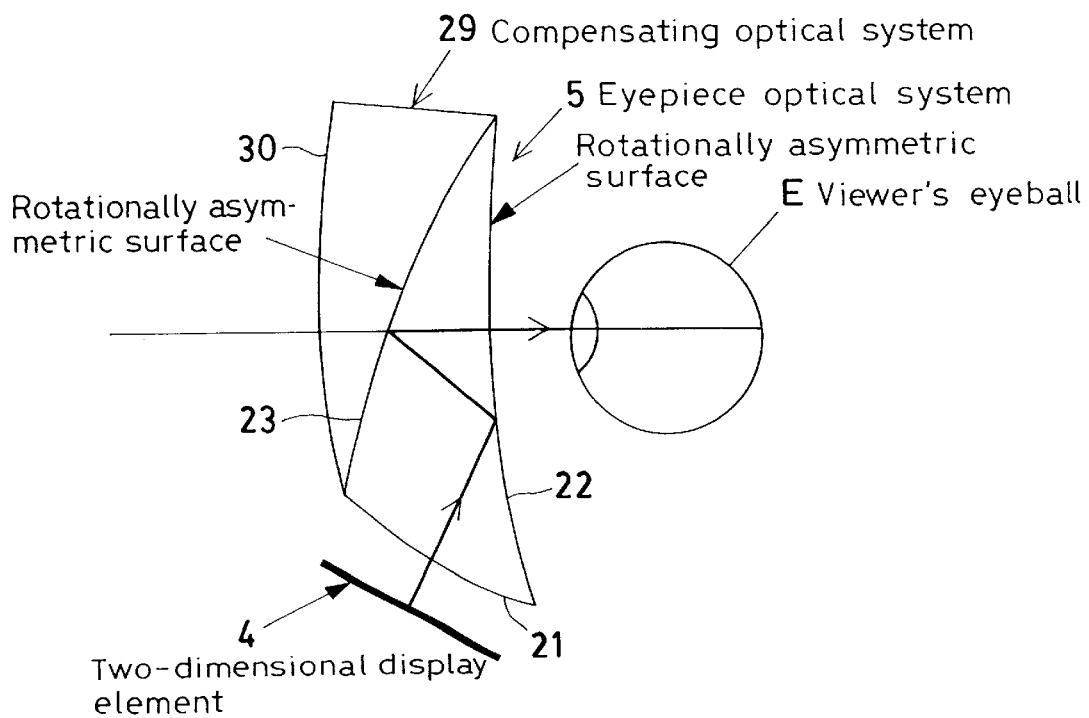
FIG. 8 is an optical path diagram for an electronic camera optical system according to Example 5.

FIG. 8 is an optical path diagram for a finder optical system according to Example 5, which enables an optical finder and an electronic view finder to be changed over to each other or superposed one upon another. In this finder optical system, a semi-transmitting and semi-reflecting surface having a combined reflecting and transmitting action is used for the third surface 23 of the eyepiece optical system 5 according to Example 2. A compensating optical system 29 is put on a front side of the semi-transmitting and semi-reflecting surface, and a see-through optical path is provided in such a way that it overlaps an optical path for magnifying and viewing an electronic image, as in Example 4. A surface of the compensating optical system 29 to be put on the third surface 23 has the same rotationally asymmetric shape as that of the third surface 23, and the opposite surface 30 thereof has the same rotationally asymmetric shape as that of the second surface 22 of the eyepiece optical system 5. The compensating optical system 29 is made up of a transparent material having a refractive index substantially similar to that of the material of which the eyepiece optical system 5 is made up.

Accordingly, a see-through optical path runs through the front surface 30 of the compensating optical system 29, the semi-transmitting and semi-reflecting surface 23 and the second surface 22 of the eyepiece optical system 5, so that an external image can be viewed apart from an image (electronic image) displayed on the two-dimensional display element 4.

Figure 9:
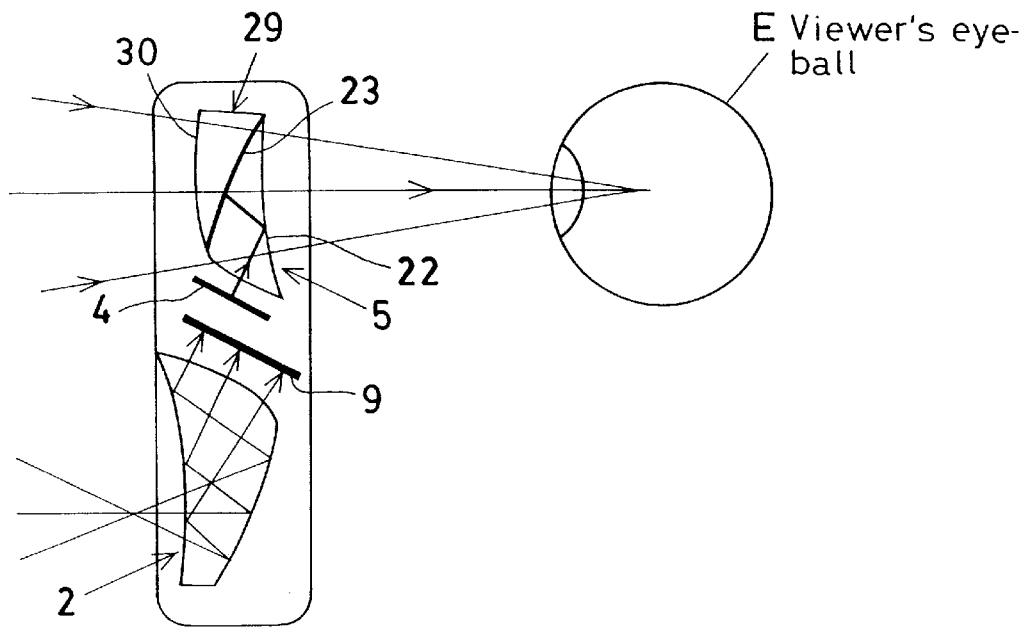
FIG. 9 is an optical path diagram for an electronic camera optical system using the finder optical system according to Example 5.

FIG. 9 is an optical path diagram for an electronic camera optical system using the finder optical system according to this example. It is here noted that an optical path for a phototaking lens 2 is reverse to that for an optical system similar to the eyepiece optical system 5 according to Example 2.

When a subject is phototaken with such an arrangement, an image of the subject is photoelectrically converted by a two-dimensional image pickup element 9 disposed at an image plane of the phototaking lens 2 while the aforesaid see-through optical path is used as an optical finder, thereby introducing it into a recording/reproducing unit 17 (FIG. 4). When a previously phototaken image is viewed, the electronic image recorded in the recording/reproducing unit 17 is displayed on the two-dimensional display element 4, so that the electronic image can be displayed on a magnified scale, as explained in Example 2.

EXAMPLE 6

Figure 10:
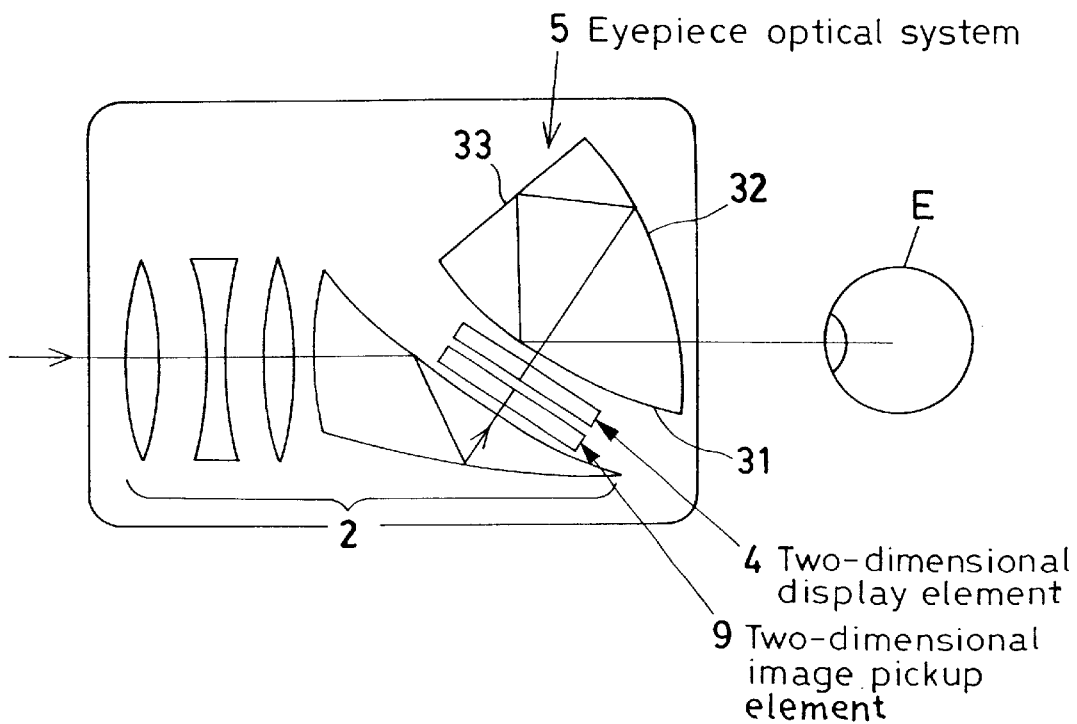
FIG. 10 is an optical path diagram for an electronic camera optical system according to Example 6.

FIG. 10 is an optical path diagram for an electronic camera optical system which also serves as a real image finder according to Example 6. In this example, the optical system shown in FIG. 1 is used as a phototaking lens 2, and an eyepiece optical system 5 is made up of a transparent medium having a refractive index greater than 1 and a given finite focal length, which is surrounded with a first or rotationally asymmetric surface 31 that is decentered in opposition to a two-dimensional display element 4 and has a combined transmitting and reflecting action, a second surface or rotationally asymmetric back-surface mirror 32 that is decentered and has a combined transmitting and reflecting surface, and a third or reflecting surface 33. A two-dimensional image pickup element 9 and the two-dimensional display element 4 are arranged back to back. In this eyepiece optical system 5, display light leaving an electronic image on the two-dimensional display element 4 is reflected at the second surface 32 through the first surface 31, then reflected at the third surface 33, then reflected at the first surface 31, and finally transmits through the second surface 32 to arrive at a viewer's eyeball E. In this electronic camera optical system, an entrance optical axis of the phototaking lens 2 is in substantial alignment with an exit optical axis of the eyepiece optical system 5.

Figure 11:
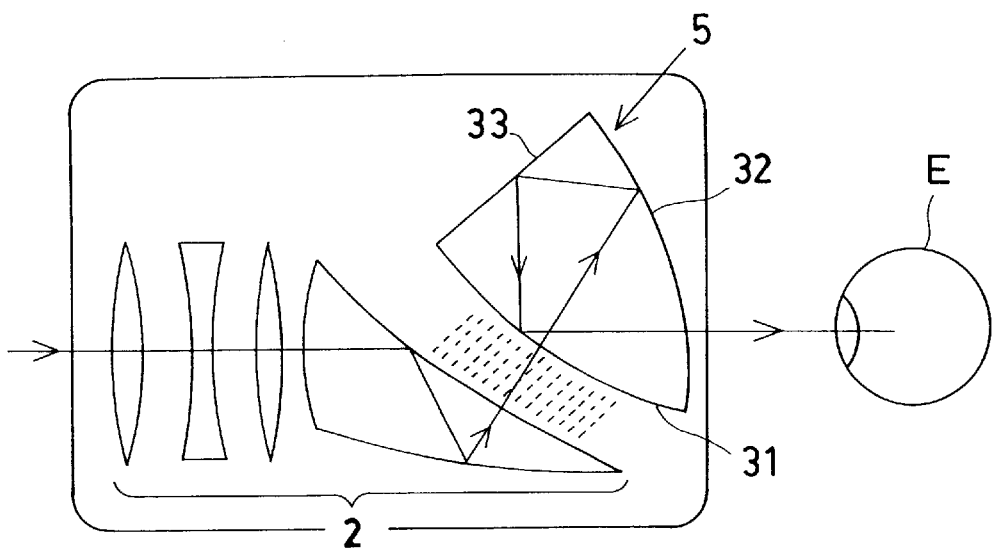
FIG. 11 is an optical path diagram for an optical system according to Example 6 in the case where it is used in the form of a variable-magnification real image finder.

When such an arrangement is used to phototake a subject through the electronic view finder or to view a previously phototaken image, an electronic image reproduced from the recording/reproducing unit 17 is displayed on the two-dimensional display element 4 on a magnified scale. When such an arrangement is used as a variable-magnification real image finder (telescope), the two-dimensional image pickup element 9 and two-dimensional display element 4 arranged back to back are positioned off the optical path, as shown in FIG. 11, so that the original position of the two-dimensional image pickup element 9 can provide an intermediate image plane. At this plane a light beam passing through the phototaking lens 2 forms an intermediate image. This intermediate image can be viewed through the eyepiece optical system 5 on a magnified scale. It is here noted that between an image pickup surface of the two-dimensional image pickup element 9 and a display surface of the two-dimensional display element 4 there is a slight distance, which may be compensated for by the focusing of the phototaking lens 2.

EXAMPLE 7

Figure 12:
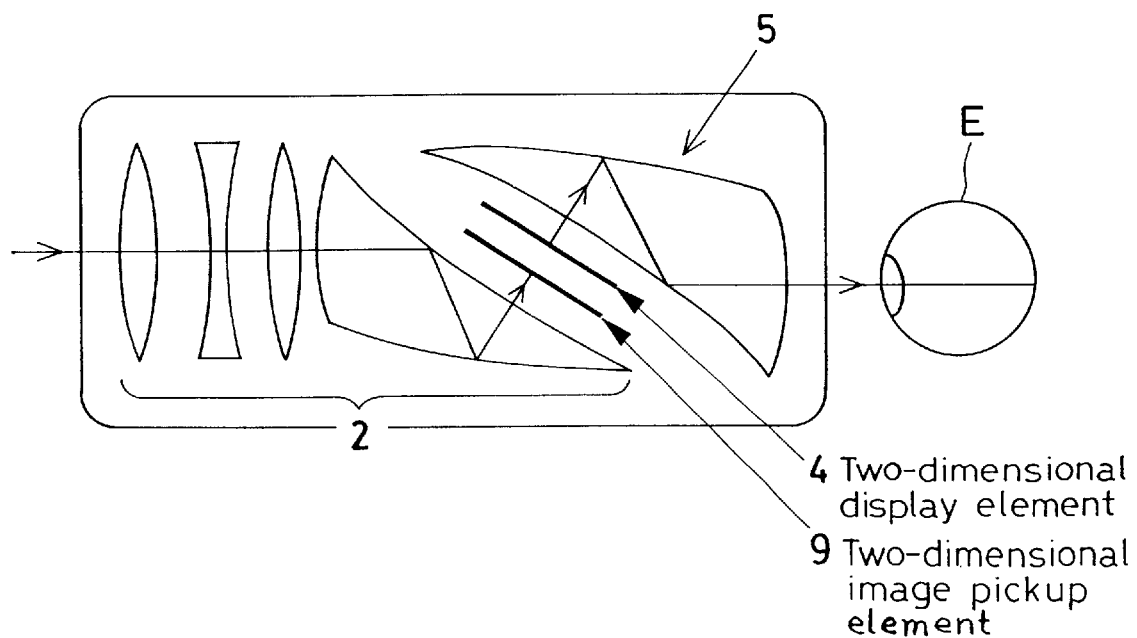
FIG. 12 is an optical path diagram from an electronic camera optical system according to Example 7.

FIG. 12 is an optical path diagram for an electronic camera optical system which also serves as a real image finder according to Example 7. In this optical system, the phototaking lens 2 of FIG. 1 is combined with the eyepiece optical system 5 of FIG. 3 (Example 1) in such a manner that an entrance optical axis of the phototaking lens 2 is in substantial alignment with an exit optical axis of the eyepiece optical system 5. No further explanation of Example 7 is made because Example 7 is similar to Example 6 with the exception of the construction of the eyepiece optical system 5.

Examples 8 to 13, given below, are directed to numerical examples of the eyepiece optical system, and Example 14, given below, is directed to a numerical example of the phototaking optical system (phototaking lens). In the following explanation, the eyepiece optical system will be described in the order of back ray tracing. Indeed, however, the object plane provides an image plane while the image plane provides an object plane disposed on the two-dimensional display element. The phototaking optical system will be described in the order of forward ray tracing.

Prior to giving an account of each example, an explanation is made concerning the definition of coordinates for defining the position and tilt of a decentered surface forming an eyepiece optical system. Numerical data about each example will be given later. It is here noted that surface Nos. are given in the order of back ray tracing for the eyepiece optical system, and in the order of forward ray tracing for the phototaking optical system.

Figure 14:
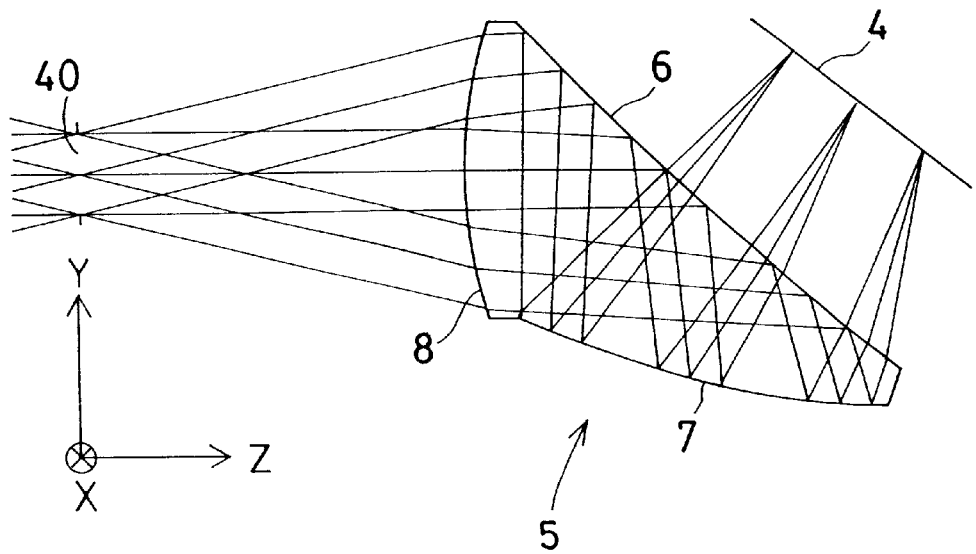
FIG. 14 is a sectional schematic of an eyepiece optical system according to Example 8.

As shown in FIG. 14, a ray passing through the center of an object point and the center of a pupil to arrive at the center of an image plane is defined as an axial chief ray, an optical axis defined by a straight line segment intersecting with a stop surface in the optical system (an exit pupil surface in the case of the eyepiece optical system) is defined as a Z-axis, an axis that is perpendicular with respect to the Z-axis and passes through the center of the stop surface, and lies within each decentered surface forming the optical system (that is, an axis lying within the chart sheet of FIG. 14) is defined as a Y-axis, and an axis that is perpendicular with respect to the Z- and Y-axes is defined as an X-axis. In this connection, a direction of the axial chief ray extending from an object point to an image plane is defined as a positive direction of the Z-axis, a direction toward a higher place in FIG. 14 is defined as a positive direction of the Y-axis, and a direction that is perpendicular to the chart sheet of FIG. 14 and directs from its front side to its back side is defined as a positive direction of the X-axis.

In the numerical data given later, the free form surface abbreviated as FFS therein, which forms a part of the optical system of each of Examples 8, 9 and 14, is defined by the aforesaid polynomial (a), and the decentration of each surface is given by the quantities of decentration of the apex position of that surface with respect to the stop surface in the optical system and the angles of tilt of the center axis of that surface (the Z-axis in polynomial (a)) with respect to the X-, Y- and Z-axes ($\alpha$, $\beta$, $\gamma$). In this regard, it is noted that positive values for $\alpha$ and $\beta$ mean a counterclockwise rotation with respect to the positive direction of their respective axes and a positive value for $\gamma$ means a clockwise rotation with respect to the positive direction of the Z-axis. Other factors such as the radius of curvature, surface separation, refractive index and Abbe's number are also given as usual.

In Examples 10, 11, 12 and 13 basically equivalent to a coaxial optical system, too, the radius of curvature of each surface, surface separations, the refractive index of medium and Abbe's number are given as usual. The decentration of a semi-transmitting and semi-reflecting surface (surface No. 3), which is inserted in each optical system and obliquely with respect to an optical axis thereof and has a combined transmitting and reflecting action, is given according to the aforesaid definition.

In this connection, it is noted that the refractive index given is a d-line refractive index (at a wavelength of 587.56 nm), and that length unit is given by mm.

EXAMPLE 8

Figure 13:
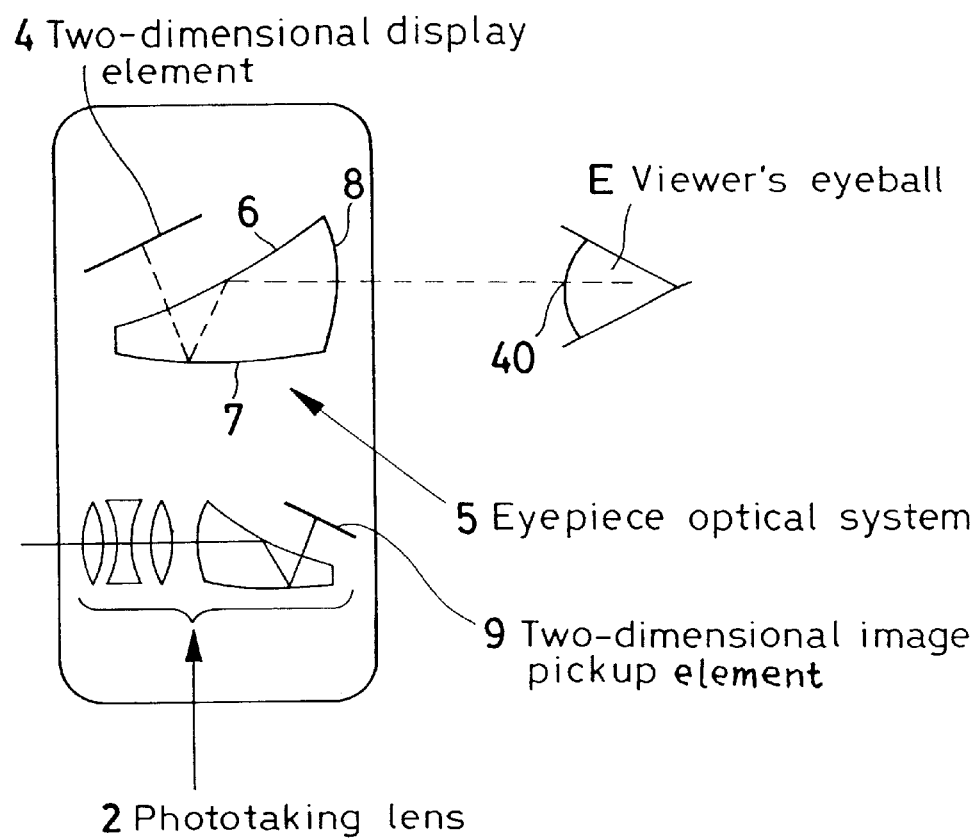
FIG. 13 is an optical path diagram for an electronic camera optical system according to Example 8.

One typical external appearance of an electronic camera according to this example is shown in FIG. 1, and an optical path diagram therefor is given in FIG. 13. This example is directed to an electronic camera using such an electronic view finder as shown in FIG. 3. Referring to FIG. 13, such an optical system as shown in FIG. 1 is used as a phototaking lens 2. A finder optical system comprises a two-dimensional display element 4 and an eyepiece optical system 5. The eyepiece system 5 has a given finite focal length, and is made up of a transparent medium having a refractive index greater than 1, which is surrounded with a first or rotationally asymmetric surface 6 that is decentered in opposition to the two-dimensional display element 4 and has a combined transmitting and reflecting action, a second surface or rotationally asymmetric back-surface mirror 7 that is decentered and has a reflecting action, and a third transmitting or rotationally asymmetric surface 8. In this optical system, display light leaving an electronic image on the two-dimensional display element 4 is reflected at the second surface 7 through the first surface 6, then reflected at the first surface 6, and finally transmits through the third surface 8 to arrive at a viewer's eyeball E with the pupil in alignment with an exit pupil 40 surface.

FIG. 14 is a sectional schematic of the eyepiece optical system 5 according to this example. Numerical data about this example will be given later. The ray tracing used is a back ray tracing. In this example, it is noted that the pupil diameter is 4 mm, the angle of view is 35° in a horizontal direction and 26.6° in a vertical direction, and the diagonal length of the two-dimensional display element 4 is 13.94 mm. It is also noted that the focal length $f_x$ in the X-Z section is 18.929 mm and the focal length $f_y$ in the Y-Z section is 17.612 mm.

EXAMPLE 9

Figure 15:
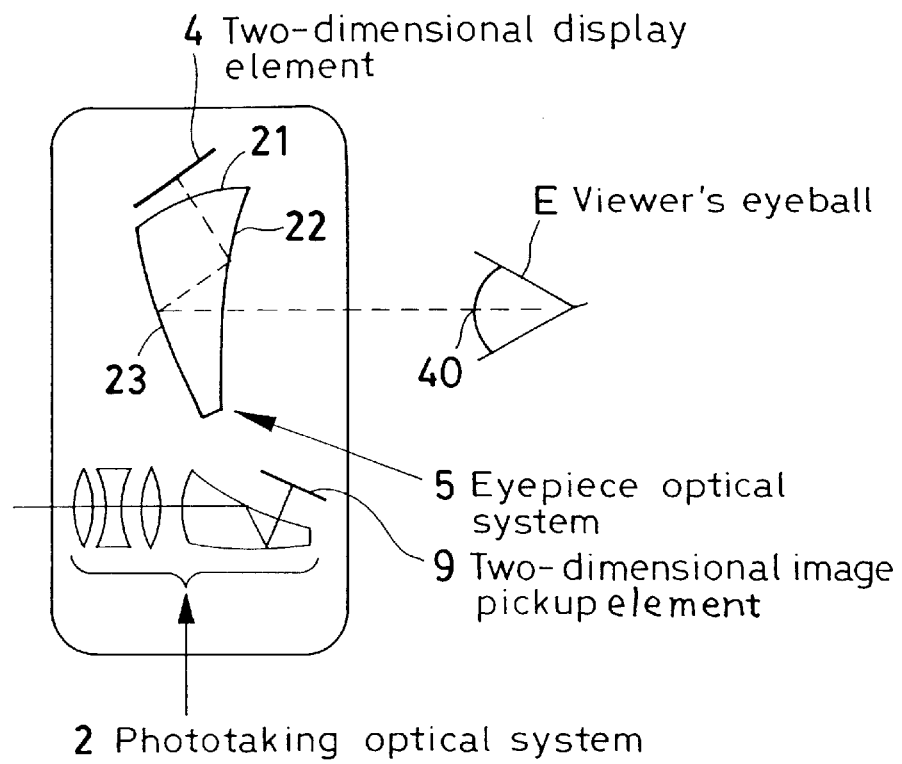
FIG. 15 is an optical path diagram for an electronic camera optical system according to Example 9.

An optical path diagram for an electronic camera according to this example is shown in FIG. 15. This example is directed to an electronic camera using such an electronic view finder as shown in FIG. 5. Referring to FIG. 15, such an optical system as shown in FIG. 1 is used as a phototaking lens 2. A finder optical system comprises a two-dimensional display element 4 and an eyepiece optical system 5. The eyepiece system 5 has a given finite focal length, and is made up of a transparent medium having a refractive index greater than 1, which is surrounded with a first transmitting or rotationally asymmetric surface 21 that is in opposition to the two-dimensional display element 4, a second or rotationally asymmetric surface 22 that is decentered and has a combined transmitting and reflecting action, and a third surface or rotationally asymmetric back-surface mirror 23 that is decentered and has a reflecting surface. In this optical system, display light leaving an electronic image on the two-dimensional display element 4 is reflected at the second surface 22 through the first surface 21, then reflected at the third surface 23, and finally transmits through the second surface 22 to arrive at a viewer's eyeball E with the pupil in alignment with an exit pupil 40 surface.

Figure 16:
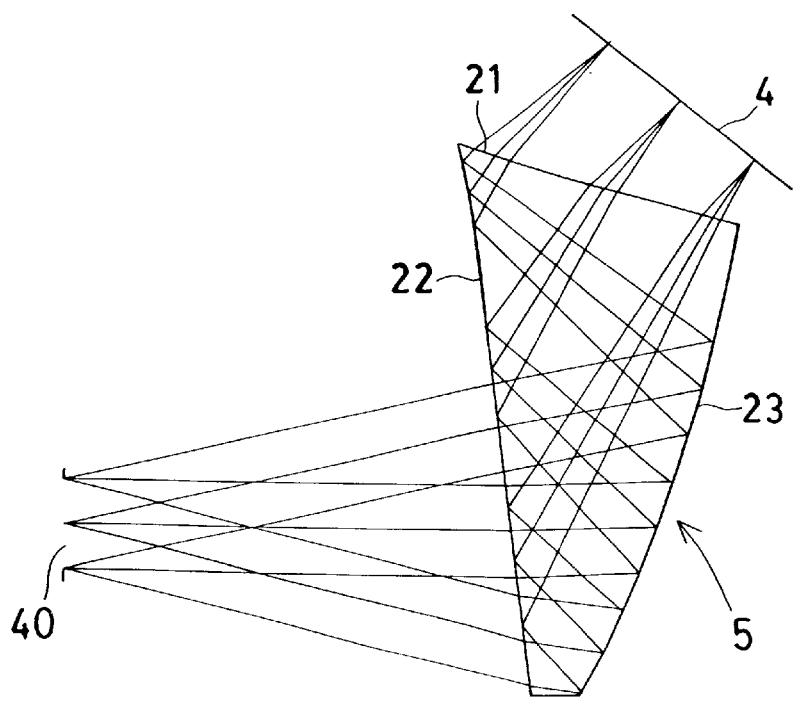
FIG. 16 is a sectional schematic of an eyepiece optical system according to Example 9.

FIG. 16 is a sectional schematic of the eyepiece optical system 5 according to this example. Numerical data about this example will be given later. The ray tracing used is a back ray tracing. In this example, it is noted that the pupil diameter is 4 mm, the angle of view is 35° in a horizontal direction and 26.6° in a vertical direction, and the diagonal length of the two-dimensional display element 4 is 13.94 mm. It is also noted that the focal length $f_x$ in the X-Z section is 18.282 mm and the focal length $f_y$ in the Y-Z section is 17.973 mm.

EXAMPLE 10

Figure 17:
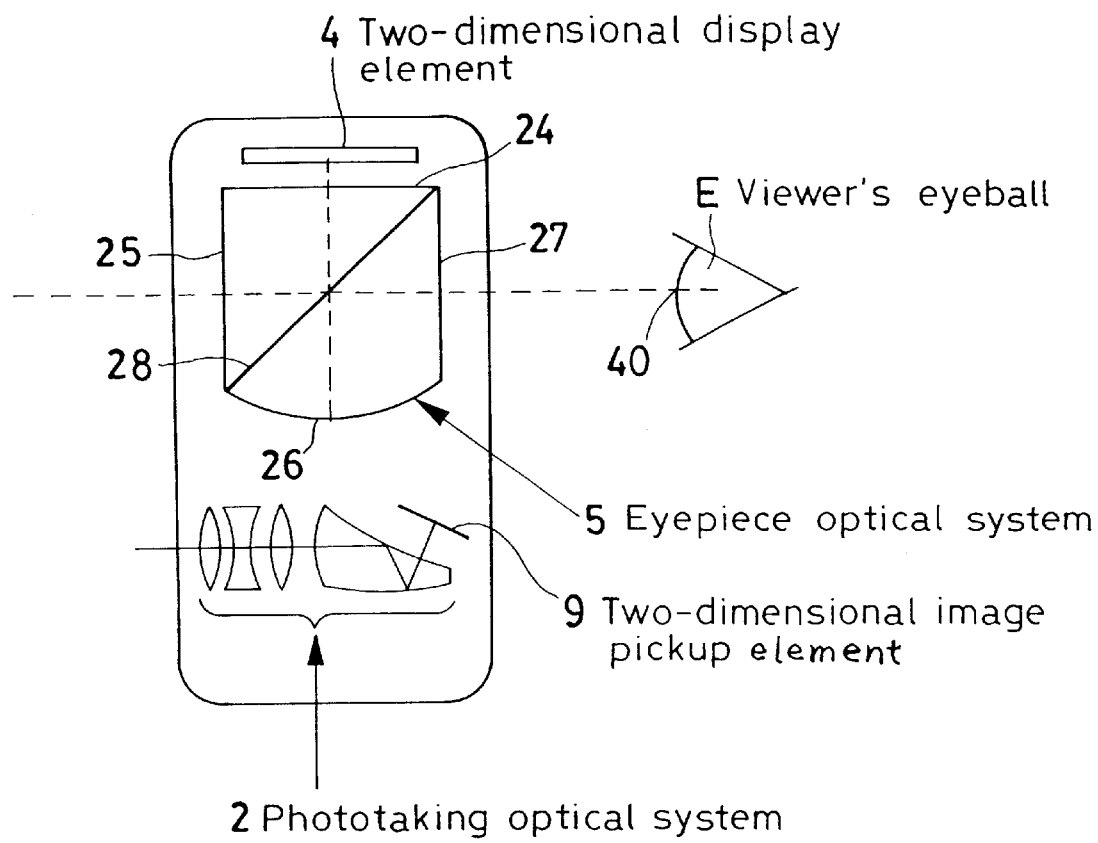
FIG. 17 is an optical path diagram for an electronic camera optical system according to Example 10.

An optical path diagram for an electronic camera according to this example is shown in FIG. 17. This example is directed to an electronic camera using the electronic view finder shown in FIG. 6. However, a two-dimensional display element 4 such as an LCD is disposed over an eyepiece optical system 5 so that ambient light, for instance, light coming from indoor illumination equipment or the sunlight can be used as an illumination light source from above the electronic camera. Referring to FIG. 17, the optical system of FIG. 1 is used as a phototaking lens 2. The finder optical system comprises the two-dimensional display element 4 and the eyepiece optical system 5. The eyepiece optical system 5 is a beam splitter prism form, and is made up of a transparent medium having a refractive index greater than 1, which is surrounded with a first surface 24, a second surface 25, a third surface 26 and a fourth surface 27. A semi-transmitting and semi-reflecting surface 28 having a combined reflecting and transmitting action is obliquely inserted in the prism. This semi-transmitting and semi-reflecting surface 28, for instance, is formed by a surface having a reflectance of 10 to 90% and a transmittance of 90 to 10%. The third surface 26 that does not oppose to the two-dimensional display element 4 is built up of a back-surface concave mirror.

In this arrangement, display light leaving an electronic image on the two-dimensional display element 4 transmits through the first spherical surface 24 and semi-transmitting and semi-reflecting surface 28, then is reflected at the spherical reflecting surface 26 of the back-surface mirror and subsequently at the semi-transmitting and semi-reflecting surface 28, and finally transmits through the fourth spherical surface 27 to arrive at a viewer's eyeball E with the pupil in alignment with an exit pupil 40 surface.

Figure 18:
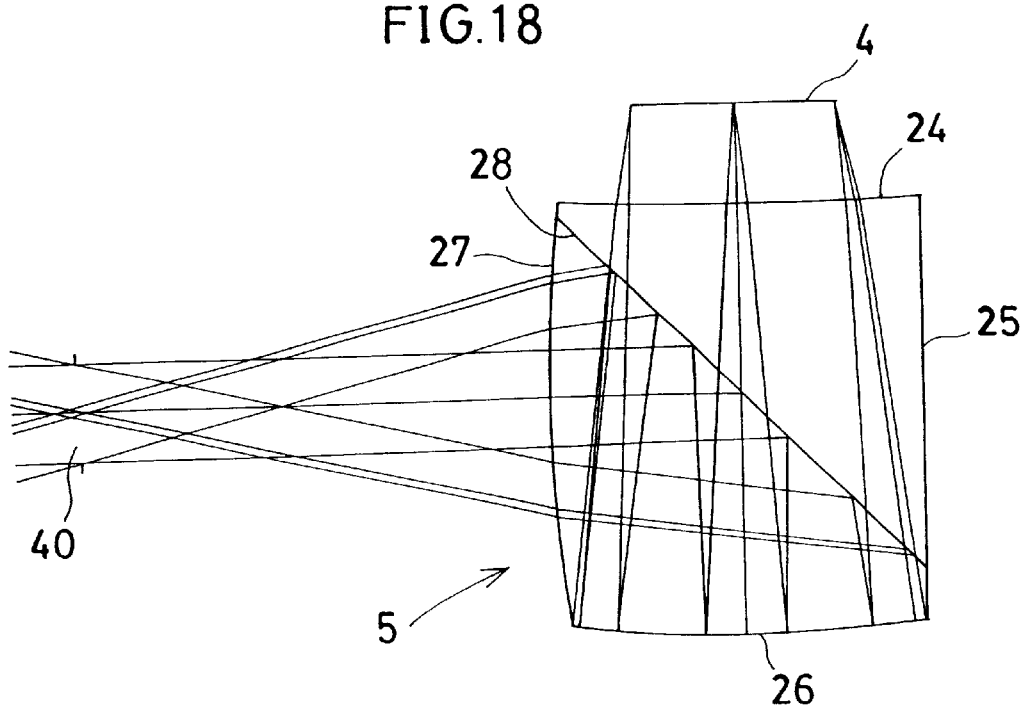
FIG. 18 is a sectional schematic of an eyepiece optical system according to Example 10.

FIG. 18 is a sectional schematic of the eyepiece optical system 5 according to this example. Numerical data about this example will be given later. The ray tracing used is a back ray tracing. In this example, it is noted that the pupil diameter is 4 mm, the angle of view is 35° in a horizontal direction and 26.6° in a vertical direction, and the diagonal length of the two-dimensional display element 4 is 13.94 mm. It is also noted that the focal length f is 18.364 mm.

EXAMPLE 11

Figure 19:
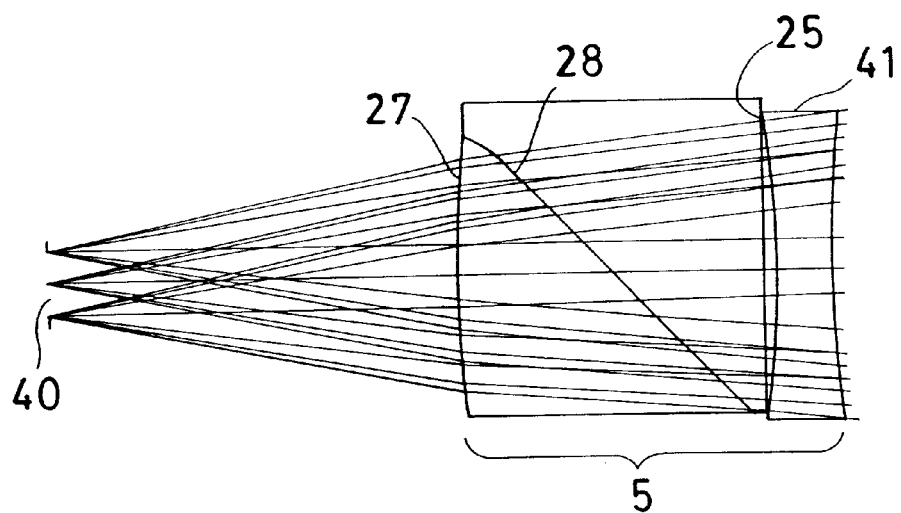

A sectional schematic of an eyepiece optical system 5 according to this example upon see-through is shown in FIG. 19. This example is a numerical example of the eyepiece optical system 5 according to Example 4 upon see-through. In this example, a concave lens 41 is disposed on an entrance see-through optical path side of the eyepiece optical system or beam splitter prism 5 to reduce the power of the see-through optical path to almost zero, thereby forming an afocal optical system used as a virtual image finder. When an external image is viewed, extraneous light takes the see-through optical path that runs through the concave lens 41, second surface 25, semi-transmitting and semi-reflecting surface 28 and fourth surface 27, but does not arrive at a concave mirror, so that the external image can be viewed apart from an image (electronic image) displayed on the two-dimensional display element 4. It is preferable to use surface reflection at the concave lens 41 on an object side, thereby constructing an Albada finder. Numerical data about this example will be given later. The ray tracing used is a back ray tracing. The afocal magnification is 0.8547.

EXAMPLE 12

Figure 20:
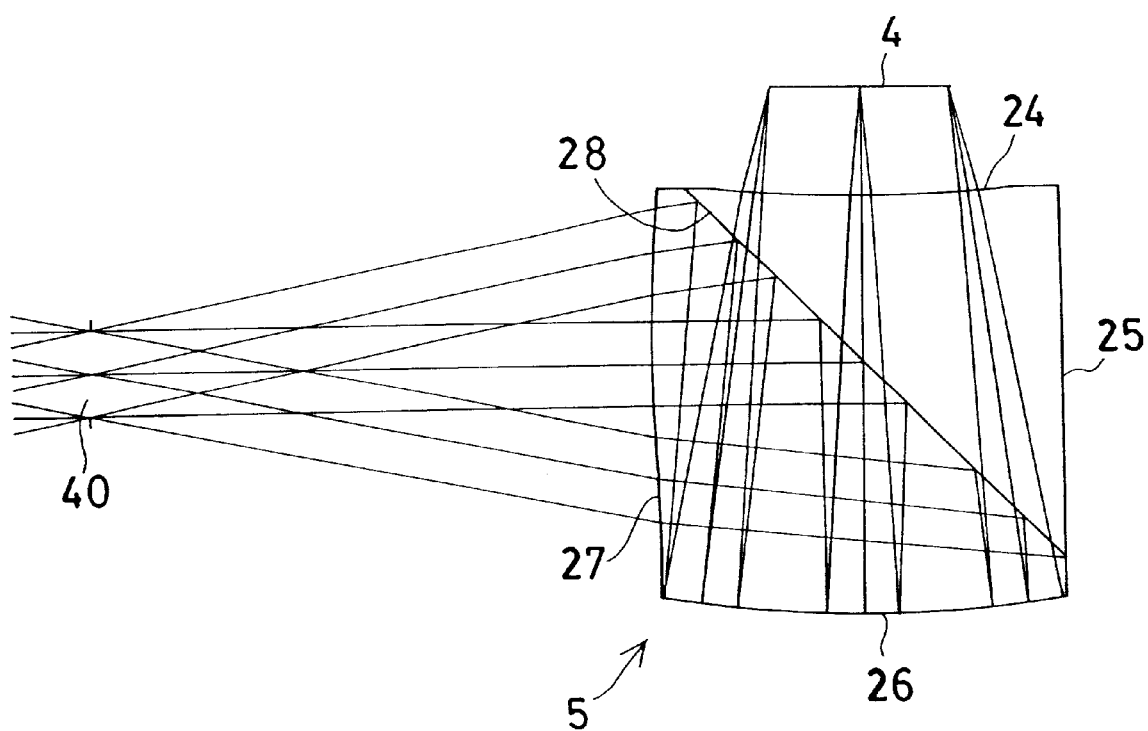
FIG. 20 is a sectional schematic of an eyepiece optical system according to Example 12.

This example is directed to one modification of the eyepiece optical system 5 according to Example 10, with a section thereof shown in FIG. 20. Numerical data about this example will be given later. The ray tracing used is a back ray tracing. In this example, it is noted that the pupil diameter is 4 mm, the angle of view is 30° in a horizontal direction and 22.7° in a vertical direction, and the diagonal length of the two-dimensional display element 4 is 13.94 mm. It is also noted that the focal length f is 21.181 mm.

EXAMPLE 13

Figure 21:
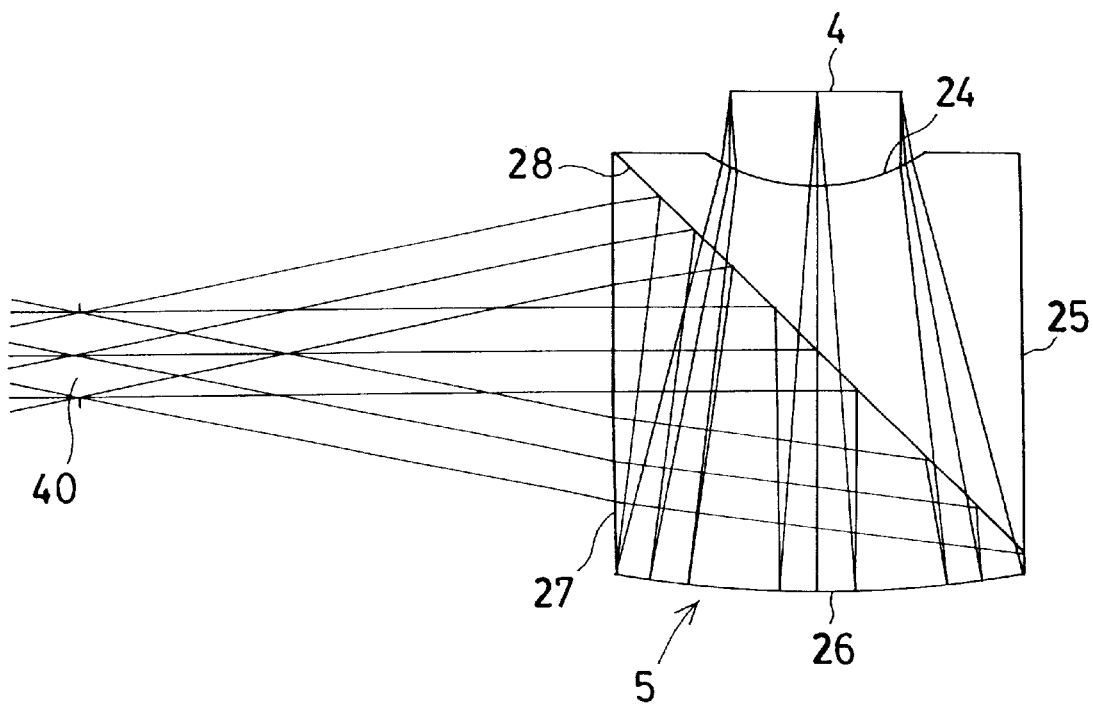
FIG. 21 is a sectional schematic of an eyepiece optical system according to Example 13.

This example is directed to another modification of the eyepiece optical system 5 according to Example 10, with a section thereof shown in FIG. 21. Numerical data about this example will be given later. The ray tracing used is a back ray tracing. In this example, it is noted that the pupil diameter is 4 mm, the angle of view is 35° in a horizontal direction and 26.6° in a vertical direction, and the diagonal length of the two-dimensional display element 4 is 13.94 mm. It is also noted that the focal length f is 22.145 mm.

EXAMPLE 14

Figure 22:
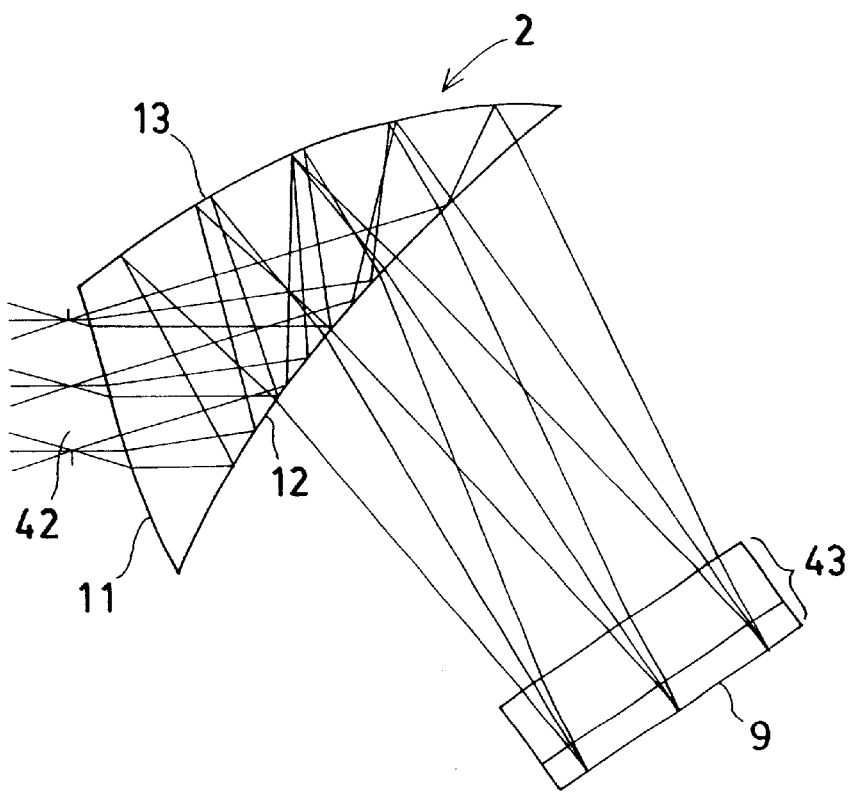
FIG. 22 is a sectional schematic of a phototaking lens according to Example 14.

This example is directed to a phototaking lens 2 that can be used with an electronic camera, with a section thereof shown in FIG. 22. This phototaking lens 2 is a single optical system made up of a decentered prism having the same construction as the fourth lens group $L_4$ in FIG. 2. This prism is made up of a transparent medium having a refractive index greater than 1, which is surrounded with a first transmitting or rotationally asymmetric surface 11 that is decentered at the rear of a stop 42, a second or rotationally asymmetric surface 12 that is decentered and has a combined transmitting and reflecting action and a third surface or rotationally asymmetric back-surface mirror 13 that is decentered and has a reflecting action. Light from a subject, which is incident on the first surface 11 via the stop 42, is reflected at the second surface 12 and then at the third surface 13, and finally trasnmits through the second surface 12 to arrive at a two-dimensional image pickup element 9 made integral with a filter and cover glass 43, where an image is formed. Preferably in view of size reductions, the reflection of light at the second surface 12 is total reflection. Thus, the size reductions are ahcievable by use of the phototaking lens 2 composed of a decentered prism.

Numerical data about this example will be enumerated later. The ray tracing used is a forward ray tracing. In this example, the entrance pupil diameter is 1.785 mm with the horizontal and vertical angels of view being 42.64° and 32.62°, respectively. Here assume that a Y-axis direction lies in the decentered portion of the surface and an X-axis direction is defined by a direction perpendicular thereto (see FIG. 14), and let NA'yi represent an angle made in the Y-Z plane between a parallel light beam incident from an entrance side of the phototaking lens 2 and spaced 1 mm away from an axial chief ray in the Y-direction and a light beam leaving the phototaking lens 2, $f_y$ denote the reciprocal of NA'yi, that is, a Y-direction focal length, and $f_x$ stand for an X-direction focal length in the X-Z plane. In this example, $f_x$ is 8.292 mm and $f_y$ is 8.076 mm.

EXAMPLE 15

Figure 23:
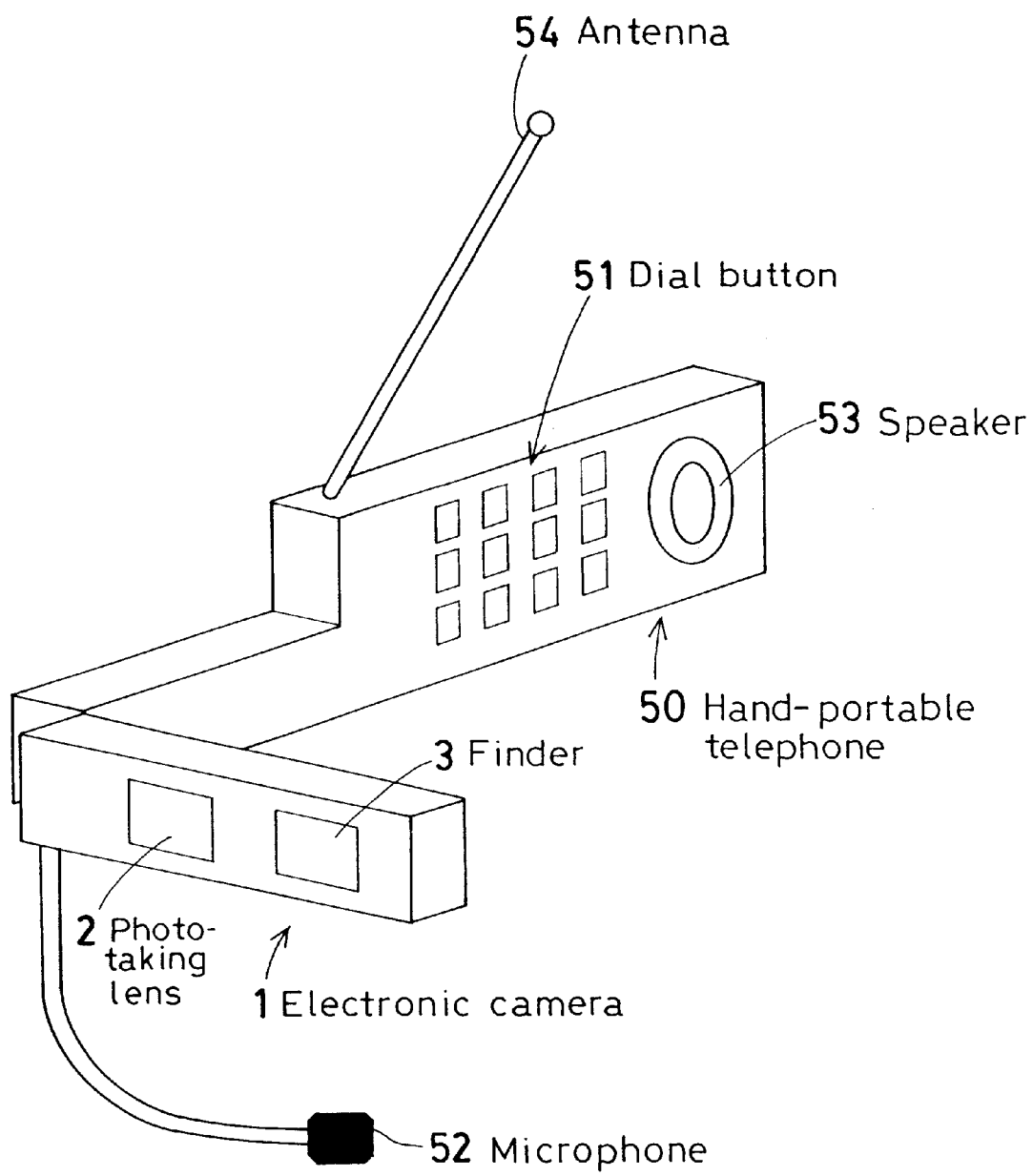
FIG. 23 is a perspective view of a hand-portable telephone system according to Example 15.

FIG. 23 is a perspective view of this example. This example is directed to a system wherein each of the compact electronic cameras described in the aforesaid examples is connected or made integral with a hand-portable telephone 50, so that a phototaken image can be sent at high speed via a telephone circuit to a personal computer at a remote place. If necessary information is transferred from imagewise data stored in the personal computer to the system, it is then possible to display it on a two-dimensional display element in an electronic camera 1, so that the image can be magnified in the form of a virtual image to display it with high-density pixels. In FIG. 23, reference numeral 51 represents a dial button of the hand-portable telephone 50, 52 a microphone, 53 a speaker, and 54 an antenna.

EXAMPLE 16

FIG. 24 is a perspective view of this example. FIG. 24(*a*) shows the general construction of a system, and FIG. 24(*b*) illustrates the construction of an electronic camera 1. In this example, each of the compact electronic cameras 1 described in the aforesaid examples (e.g., the phototaking lens 2 of Example 14 and the eyepiece optical system 5 of Example 10) is detachably attached to a hand-portable telephone 50.

Enumerated below are numerical data about Examples 8 to 14.

EXAMPLE 8

| Surface No. | Radius of curvature | Surface separation | Displacement and tilt | Refractive index | Abbe's No. |
|---|---|---|---|---|---|
| (Object plane | ∞ | −2000.0000 | | | |
| 1 | ∞(Stop) | | | | |
| 2 | FFS[1] | | (1) | 1.4922 | 57.5 |
| 3 | FFS[2] | | (2) | 1.4922 | 57.5 |
| 4 | FFS[3] | | (3) | 1.4922 | 57.5 |
| 5 | FFS[2] | | (2) | | |
| Image plane | ∞ | | (4) | | |

FFS[1]
$C_5$ $2.2153 \times 10^{-2}$ $C_7$ $2.8411 \times 10^{-2}$ $C_8$ 0
$C_{10}$ 0 $C_{12}$ 0 $C_{14}$ $-3.1319 \times 10^{-5}$
FFS[2]
$C_5$ $2.0409 \times 10^{-3}$ $C_7$ $6.6975 \times 10^{-3}$ $C_8$ $-1.8605 \times 10^{-5}$
$C_{10}$ $-7.9159 \times 10^{-5}$ $C_{12}$ 0 $C_{14}$ $-7.5458 \times 10^{-6}$
FFS[3]
$C_5$ $9.9446 \times 10^{-3}$ $C_7$ $1.1558 \times 10^{-2}$ $C_8$ $-7.0627 \times 10^{-5}$
$C_{10}$ $-1.1373 \times 10^{-4}$ $C_{12}$ 0 $C_{14}$ $-4.6407 \times 10^{-6}$ Displacement and tilt

| | X | Y | Z | α (°) | β (°) | γ (°) |
|---|---|---|---|---|---|---|
| (1) | 0.000 | 0.000 | 20.124 | 0.00 | 0.00 | 0.00 |
| (2) | 0.000 | 0.000 | 30.714 | 47.72 | 0.00 | 0.00 |
| (3) | 0.000 | −10.321 | 31.697 | 75.96 | 0.00 | 0.00 |
| (4) | 0.000 | 3.586 | 40.230 | 52.31 | 0.00 | 0.00 |

EXAMPLE 9

| Surface No. | Radius of curvature | Surface separation | Displacement and tilt | Refractive index | Abbe's No. |
|---|---|---|---|---|---|
| Object plane | ∞ | −2000.0000 | | | |
| 1 | ∞(Stop) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[3] | | (3) | | |
| Image plane | ∞ | | (4) | | |

FFS[1]
$C_5$ $1.8566 \times 10^{-4}$ $C_7$ $-5.9960 \times 10^{-3}$ $C_8$ $-9.3755 \times 10^{-6}$
$C_{10}$ $-1.2098 \times 10^{-4}$
FFS[2]
$C_5$ $-7.8289 \times 10^{-3}$ $C_7$ $-1.1744 \times 10^{-2}$ $C_8$ $-1.4839 \times 10^{-5}$
$C_{10}$ $1.2340 \times 10^{-5}$
FFS[3]

-continued

| | | | | | |
|---|---|---|---|---|---|
| $C_5$ | $-1.9292 \times 10^{-4}$ | $C_7$ | $-1.8773 \times 10^{-1}$ | $C_8$ | $1.2657 \times 10^{-6}$ |
| $C_{10}$ | $4.7538 \times 10^{-4}$ | | | | |

Displacement and tilt

| | X | Y | Z | α (°) | β (°) | γ (°) |
|---|---|---|---|---|---|---|
| (1) | 0.000 | 7.230 | 19.284 | 8.28 | 0.00 | 0.00 |
| (2) | 0.000 | 0.330 | 27.044 | -19.41 | 0.00 | 0.00 |
| (3) | 0.000 | 2.351 | 369.458 | 92.61 | 0.00 | 0.00 |
| 偏心(4) | 0.000 | 19.316 | 27.698 | 52.14 | 0.00 | 0.00 |

EXAMPLE 10

| Surface No. Object plane | Radius of curvature | Surface separation | Displacement and tilt | Refractive index | Abbe's No. |
|---|---|---|---|---|---|
| | ∞ | -1000.00 | | | |
| 1 | ∞(Stop) | 20.00 | | | |
| 2 | 65.895 | 8.00 | | 1.4922 | 57.5 |
| 3 | ∞ | -10.00 | (1) | 1.4922 | 57.5 |
| 4 | 57.009 | 18.00 | | 1.4922 | 57.5 |
| 5 | 187.069 | 4.16 | | | |
| Image plane | ∞ | | | | |

Displacement and tilt

| | X | Y | Z | α(°) | β(°) | γ(°) |
|---|---|---|---|---|---|---|
| (1) | 0.000 | 0.000 | 0.000 | 45.00 | 0.00 | 0.00 |

EXAMPLE 11

| Surface No. Object plane | Radius of curvature | Surface separation | Displacement and tilt | Refractive index | Abbe's No. |
|---|---|---|---|---|---|
| | ∞ | -1000.00 | | | |
| 1 | ∞(Stop) | 27.00 | | | |
| 2 | 75.396 | 10.00 | | 1.4922 | 57.5 |
| 3 | ∞ | 10.00 | (1) | 1.4922 | 57.5 |
| 4 | ∞ | 1.00 | | | |
| 5 | -65.000 | 3.00 | | 1.4922 | 57.5 |
| 6 | 65.000 | 971.98 | | | |
| Image plane | ∞ | | | | |

Displacement and tilt

| | X | Y | Z | α(°) | β(°) | γ(°) |
|---|---|---|---|---|---|---|
| (1) | 0.000 | 0.000 | 0.000 | 45.00 | 0.00 | 0.00 |

EXAMPLE 12

| Surface No. Object plane | Radius of curvature | Surface separation | Displacement and tilt | Refractive index | Abbe's No. |
|---|---|---|---|---|---|
| | ∞ | -1000.00 | | | |
| 1 | ∞(Stop) | 27.00 | | | |
| 2 | 75.396 | 10.00 | | 1.4922 | 57.5 |
| 3 | ∞ | -12.00 | (1) | 1.4922 | 57.5 |
| 4 | 64.455 | 20.00 | | 1.4922 | 57.5 |
| 5 | 108.418 | 4.96 | | | |
| Image plane | | | | | |

Displacement and tilt

| | X | Y | Z | α(°) | β(°) | γ(°) |
|---|---|---|---|---|---|---|
| (1) | 0.000 | 0.000 | 0.000 | 45.00 | 0.00 | 0.00 |

EXAMPLE 13

| Surface No. Object plane | Radius of curvature | Surface separation | Displacement and tilt | Refractive index | Abbe's No. |
|---|---|---|---|---|---|
| | ∞ | -1000.00 | | | |
| 1 | ∞(Stop) | 27.00 | | | |
| 2 | ∞ | 10.00 | | 1.4922 | 57.5 |
| 3 | ∞ | -12.00 | (1) | 1.4922 | 57.5 |
| 4 | 52.292 | 20.00 | | 1.4922 | 57.5 |
| 5 | 9.711 | 4.78 | | | |
| Image plane | ∞ | | | | |

Displacement and tilt

| | X | Y | Z | α(°) | β(°) | γ(°) |
|---|---|---|---|---|---|---|
| (1) | 0.000 | 0.000 | 0.000 | 45.00 | 0.00 | 0.00 |

EXAMPLE 14

| Surface No. Object plane | Radius of curvature | Surface separation | Displacement and tilt | Refractive index | Abbe's No. |
|---|---|---|---|---|---|
| | ∞ | -1000.00 | | | |
| 1 | ∞(Stop) | | | | |
| 2 | FFS[1] | | (1) | 1.8061 | 50.9 |
| 3 | FFS[2] | | (2) | 1.8061 | 50.9 |
| 4 | FFS[3] | | (3) | 1.8061 | 50.9 |
| 5 | FFS[2] | | (2) | | |
| 6 | ∞ | 1.00 | (4) | 1.5163 | 64.1 |
| 7 | ∞ | 0.40 | | 1.5163 | 64.1 |
| Image plane | ∞ | | | | |

FFS[1]

| | | | | | |
|---|---|---|---|---|---|
| $C_5$ | $6.9172 \times 10^{-3}$ | $C_7$ | $6.1395 \times 10^{-2}$ | $C_8$ | $-8.6695 \times 10^{-3}$ |
| $C_{10}$ | $9.3979 \times 10^{-3}$ | $C_{12}$ | $-1.1168 \times 10^{-4}$ | $C_{14}$ | $-6.6955 \times 10^{-3}$ |
| $C_{16}$ | $-1.0032 \times 10^{-3}$ | | | | |

FFS [2]

| | | | | | |
|---|---|---|---|---|---|
| $C_5$ | $2.9915 \times 10^{-2}$ | $C_7$ | $1.8072 \times 10^{-2}$ | $C_8$ | $-1.4235 \times 10^{-3}$ |
| $C_{10}$ | $-1.3855 \times 10^{-4}$ | $C_{12}$ | $1.7627 \times 10^{-4}$ | $C_{14}$ | $-5.1449 \times 10^{-4}$ |
| $C_{16}$ | $2.9926 \times 10^{-5}$ | $C_{17}$ | $-2.0752 \times 10^{-5}$ | $C_{19}$ | $2.2598 \times 10^{-4}$ |
| $C_{21}$ | $2.8425 \times 10^{-5}$ | $C_{23}$ | $-8.5787 \times 10^{-6}$ | $C_{25}$ | $-3.9807 \times 10^{-5}$ |
| $C_{27}$ | $4.2915 \times 10^{-6}$ | | | | |

FFS[3]

| | | | | | |
|---|---|---|---|---|---|
| $C_5$ | $-5.3125 \times 10^{-2}$ | $C_7$ | $-4.1643 \times 10^{-2}$ | $C_8$ | $6.4987 \times 10^{-4}$ |
| $C_{10}$ | $3.2017 \times 10^{-5}$ | $C_{12}$ | $-2.1358 \times 10^{-4}$ | $C_{14}$ | $-2.5418 \times 10^{-4}$ |
| $C_{16}$ | $-1.4899 \times 10^{-4}$ | $C_{17}$ | $2.0960 \times 10^{-6}$ | $C_{19}$ | $3.5556 \times 10^{-5}$ |
| $C_{21}$ | $1.6431 \times 10^{-5}$ | | | | |

Displacement and tilt

| | X | Y | Z | α(°) | β(°) | γ(°) |
|---|---|---|---|---|---|---|
| (1) | 0.000 | 0.000 | 0.487 | 14.82 | 0.00 | 0.00 |
| (2) | 0.000 | 1.030 | 3.861 | -43.09 | 0.00 | 0.00 |
| (3) | 0.000 | 3.587 | 4.807 | 100.40 | 0.00 | 0.00 |
| (4) | 0.000 | -3.356 | 7.512 | -56.54 | 0.00 | 0.00 |

As can be understood from the foregoing explanation, the present invention can provide a compact electronic camera which enables an electronic image to be displayed on a two-dimensional display element while it is phototaken or after it has been phototaken, so that the image can be magnified and displayed by a compact magnifying optical system constructed of a curved reflecting mirror to view a phototaken image of high precision.

What we claim is:

1. An electronic camera comprising:

phototaking optical system, two-dimensional image pickup element for receiving an object image formed by said phototaking optical system, two-dimensional display element for displaying said object image in the form of an image to be viewed, and magnifying optical system for guiding said image to a viewer's eyeball, wherein:

said magnifying optical system includes a first reflecting surface for turning back an optical path between said two-dimensional display element and said viewer's eyeball to achieve compactness, said first reflecting surface is formed by a curved surface having an image-magnifying action, and the following conditions are satisfied:

$$f<20 \text{ (mm)}$$
$$L<15 \text{ (mm)},$$

where f is the focal length of the magnifying optical system and L is the diagonal length of the two-dimensional display element.

2. An electronic camera according to claim 1, wherein:

said magnifying optical system further includes a second reflecting surface located in opposition to said first reflecting surface to turn back an optical path between said first reflecting surface and said second reflecting surface, thereby making a distance between said two-dimensional display element and said viewer's eyeball short.

3. An electronic camera according to claim 2, wherein:

said first reflecting surface and said second reflecting surface are a prism member made up of a transparent medium having a reflective index (n) greater than 1.3 (n>1.3).

4. An electronic camera according to claim 3, wherein:

said first reflecting surface is formed on one surface of said prism member, and said second reflecting surface is located at a position where a medium of said prism member is sandwiched between said first reflecting surface and said second reflecting surface.

5. An electronic camera according to claim 3, wherein:

said second reflecting surface is a combined transmitting and reflecting surface.

6. An electronic camera according to claim 3, wherein:

at least one of said first reflecting surface or said second reflecting surface is formed by a rotationally asymmetric surface having an action to make correction for aberrations produced by decentration.

7. An electronic camera according to claim 6, wherein:

said two-dimensional image pickup element is located in opposition to said two dimensional display element.

8. An electronic camera according to any one of claims 1 to 7, wherein:

said magnifying optical system has two actions, one to guide an image displayed on said two-dimensional display element to said viewer's eyeball and the other to guide object light phototaken by said phototaking optical system directly to said viewer's eyeball.

9. An electronic camera according to any one of claims 1 to 7, which further comprises between said two-dimensional image pick up element and said two-dimensional display element a signal processing circuit, a controller, a driver and a recording/reproducing unit so that an object image received at said two-dimensional image pickup element is recorded in said recording/reproducing unit upon photoelectric conversion and, at the same time, is displayed on said two-dimensional display element by said driver via said controller during phototaking, and, after phototaking, a signal recorded in said recording/reproducing unit is reproduced to display an electronic image on said two-dimensional display element by said driver via said controller.

* * * * *